US011413879B2

(12) United States Patent
Yuasa

(10) Patent No.: US 11,413,879 B2
(45) Date of Patent: Aug. 16, 2022

(54) EDITING DEVICE EDITING PRINT DATA FOR CREATING LABEL WITH PRINTER TO WHICH TAPE CASSETTE IS ATTACHABLE

(71) Applicant: BROTHER KOGYO KABUSHIKI KAISHA, Nagoya (JP)

(72) Inventor: Eri Yuasa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 322 days.

(21) Appl. No.: 16/831,523

(22) Filed: Mar. 26, 2020

(65) Prior Publication Data
US 2020/0406633 A1 Dec. 31, 2020

(30) Foreign Application Priority Data
Jun. 28, 2019 (JP) .............................. JP2019-122204

(51) Int. Cl.
*B41J 3/36* (2006.01)
*G06F 3/12* (2006.01)
*B41J 15/04* (2006.01)
*B41J 3/407* (2006.01)

(52) U.S. Cl.
CPC ............... *B41J 3/36* (2013.01); *B41J 3/4075* (2013.01); *B41J 15/044* (2013.01); *G06F 3/1208* (2013.01); *G06F 3/1256* (2013.01)

(58) Field of Classification Search
None
See application file for complete search history.

(56) References Cited

U.S. PATENT DOCUMENTS

| 5,890,820 A | 4/1999 | Handa | |
|---|---|---|---|
| 6,196,740 B1* | 3/2001 | Yamaguchi | B26D 5/00 400/615.2 |
| 2004/0257390 A1* | 12/2004 | Ito | G06F 3/1241 347/5 |
| 2006/0222429 A1* | 10/2006 | Kurashina | B41J 3/32 400/621 |
| 2019/0039387 A1* | 2/2019 | Ogawa | B41J 3/4075 |

FOREIGN PATENT DOCUMENTS

| JP | H09-48158 A | 2/1997 |
|---|---|---|
| JP | 2003-196669 A | 7/2003 |
| JP | 2006-101390 A | 4/2006 |
| JP | 2010-017937 A | 1/2010 |

* cited by examiner

*Primary Examiner* — Matthew G Marini
(74) *Attorney, Agent, or Firm* — Kenealy Vaidya LLP

(57) ABSTRACT

In an editing device, a controller is configured to perform: editing; and displaying. The editing edits print data for a composite label to be created by affixing at least one overlay label to a base label. A printer is configured to perform a single printing operation using an ink ribbon to print an object on a tape in a single printing color thereby creating a single label. The editing includes: determining a printing color of an object; categorizing the object to one of a base object and an overlay object; and setting a print mode to one of a shortest length mode in which a single overlay label is created for each overlay object and a fewest prints mode in which a single overlay label is created for all overlay objects having a same printing color. The displaying displays a composite label image based on the print data.

8 Claims, 14 Drawing Sheets

FIG. 3
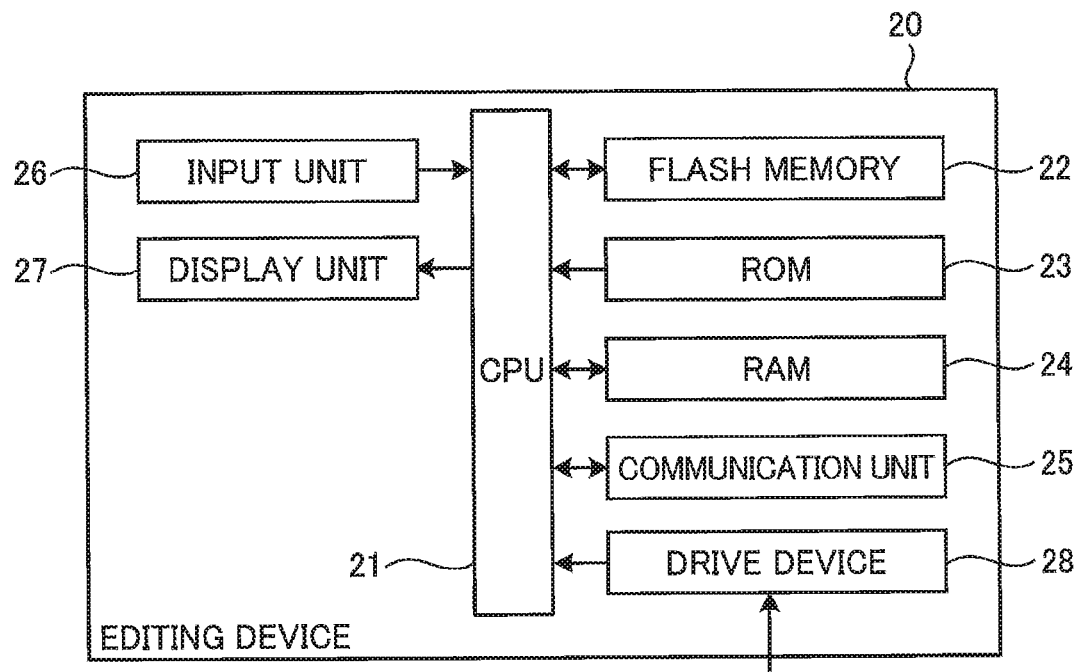
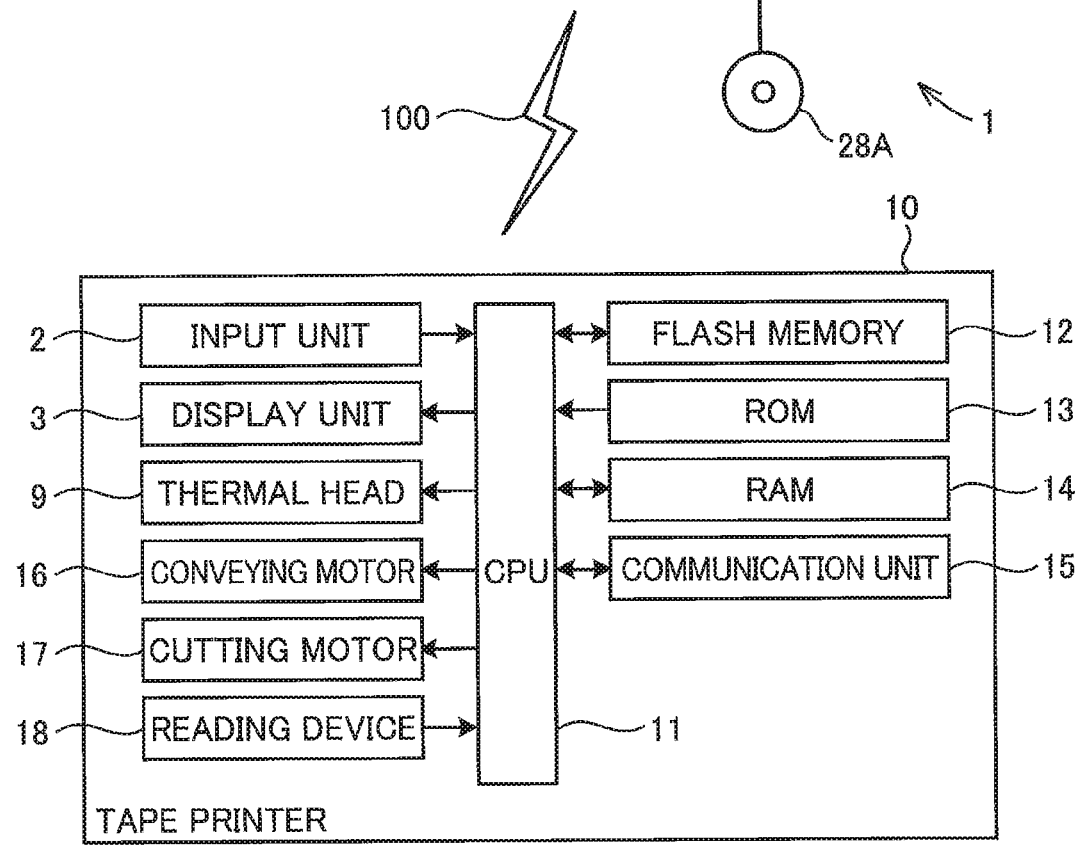

EDITING DEVICE EDITING PRINT DATA FOR CREATING LABEL WITH PRINTER TO WHICH TAPE CASSETTE IS ATTACHABLE

CROSS REFERENCE TO RELATED APPLICATION

This application claims priority from Japanese Patent Application No. 2019-122204 filed Jun. 28, 2019. The entire content of the priority application is incorporated herein by reference.

TECHNICAL FIELD

The present disclosure relates to an editing device.

BACKGROUND

A conventional printing system is provided with a tape printer and an editing device. The tape printer creates a base label and clear overlay labels by printing objects on tape using an ink ribbon. The overlay labels are then affixed to the base label to create a composite label. The editing device is used to edit print data for creating the composite label.

SUMMARY

However, objects printed on an overlay label often do not span the entire label, such as when the objects are spaced apart from each other. Such cases lead to a waste of tape when the overlay label, created based on print data edited on the editing device, has the same approximate size as the base label.

In view of the foregoing, it is an object of the present disclosure to provide an editing device that can edit print data according to an intended purpose.

In order to attain the above and other objects, the present disclosure provides an editing device including a controller. The controller is configured to perform: (a) editing; and (b) displaying. The (a) editing edits print data for creating a composite label with a printer. A tape cassette is attachable to the printer. The tape cassette accommodates therein a tape and an ink ribbon. The tape extends in a longitudinal direction and has a tape width in a width direction orthogonal to the longitudinal direction. The ink ribbon has an ink color. The printer is configured to perform a single printing operation using the ink ribbon to print an object on the tape in a single printing color thereby creating a single label. The single printing color is identical to the ink color of the ink ribbon. The composite label has a plurality of labels including a base label and at least one overlay label. The composite label is created by affixing the at least one overlay label to the base label. The (a) editing includes: (a1) acquiring; (a2) determining; (a3) acquiring; (a4) categorizing; (a) setting; and (a6) setting. The (a1) acquiring acquires a plurality of pieces of object data corresponding to respective ones of a plurality of objects. The plurality of pieces of object data represents respective ones of a plurality of object images. Each of the plurality of object images is rendered in the single printing color. The print data is created using the plurality of pieces of object data. The (a2) determining determines a printing color of a target object. The target object is selected one by one from among the plurality of objects. The (a3) acquiring acquires tape information on a target tape cassette to be used for printing the target object with the printer. The target tape cassette accommodates therein a target tape and a target ink ribbon. The target ink ribbon has the ink color identical to the printing color of the target object. The tape information of the target tape includes width information and opacity information. The tape information indicates the tape width of the target tape. The opacity information indicates whether the target tape is opaque. The (a4) categorizing categorizes the target object to one of a base object and an overlay object according to the printing color of the target object and the tape information of the target tape. The plurality of objects is respectively categorized to a single base object and at least one overlay object. The (a5) setting sets, in response to categorizing the target object to the overlay object, a target tape length and a target tape orientation. The target tape length is a length in the longitudinal direction of the target tape used for creating the overlay label. The (a6) setting sets a print mode to one of a shortest length mode and a fewest prints mode. In the shortest length mode, a single overlay label is created for each overlay object. In the fewest prints mode, a single overlay label is created for all overlay objects each of which has a same printing color. The (b) displaying displays a composite label image of the composite label based on the print data on a display.

BRIEF DESCRIPTION OF THE DRAWINGS

The particular features and advantages of the disclosure as well as other objects will become apparent from the following description taken in connection with the accompanying drawings, in which:

FIGS. 2A and 2B is an explanatory diagram illustrating creation of a composite label, in which FIG. 2A illustrates a base label and three overlay labels, and FIG. 2B illustrates the composite label created when the three overlay labels are affixed to the base label;

FIG. 3 is a block diagram illustrating an electrical configuration of the printing system including the tape printer and the editing device according to the embodiment of the present disclosure;

DETAILED DESCRIPTION

Figure 1:
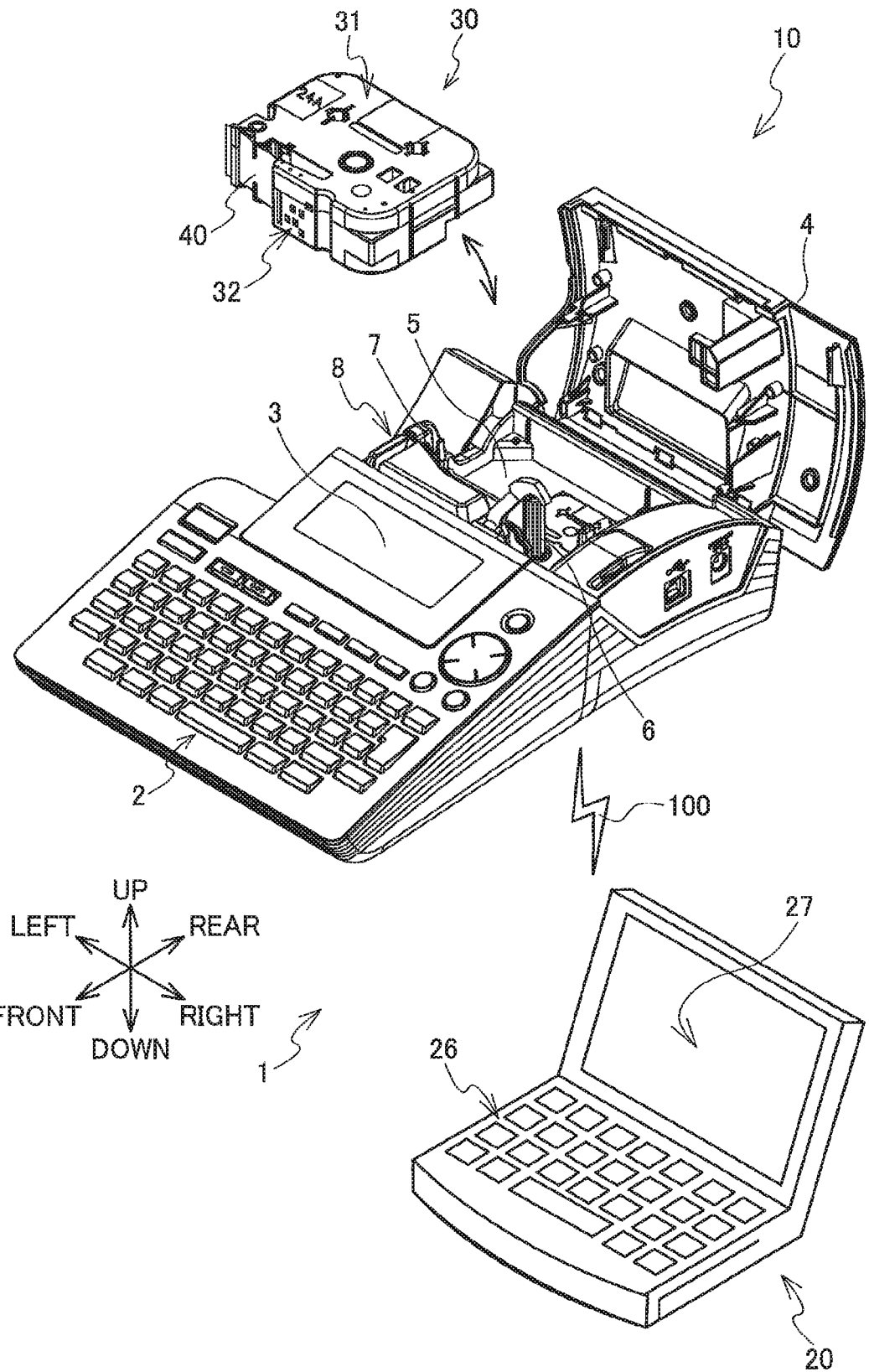
FIG. 1 is a perspective view of a printing system including a tape printer and an editing device according to an embodiment of the present disclosure.

A printing system 1 according to one embodiment of the present disclosure will be described while referring to the accompanying drawings. The referenced drawings are used to describe the technical features made possible with the present disclosure. The configurations of the apparatuses described in the drawings are merely examples, and the present disclosure is not intended to be limited to these configurations.

First, an overview of the printing system 1 will be given with reference to FIG. 1. The printing system 1 includes an editing device 20, and a tape printer 10. The editing device 20 is a common personal computer. The editing device 20 can communicate with the tape printer 10 over a network 100. The editing device 20 can edit print data for printing objects on a tape 40 in order to create labels. Objects may include characters, graphics, symbols, and the like. The tape printer 10 performs printing operations using an ink ribbon to print objects on the tape 40 based on the print data edited on the editing device 20. In one print, the tape printer 10 can print in only a single color.

Here, the general structure of the tape printer 10 will be described. In the following description, the upper-left side, lower-right side, lower-left side, upper-right side, top side, and bottom side in FIG. 1 will define the corresponding left side, right side, front side, rear side, top side, and bottom side of the tape printer 10 and a tape cassette 30.

The tape printer 10 is provided with an input unit 2, a display unit 3, a cover 4, and a cassette mounting section 5. The input unit 2 is provided in the top surface of the tape printer 10. The user operates the input unit 2 in order to input various information into the tape printer 10. The display unit 3 is provided to the rear of the input unit 2. The display unit 3 displays various types of information. The cover 4 is provided on the rear side of the display unit 3 and can open and close over the cassette mounting section 5.

The cassette mounting section 5 is provided on the rear side of the display unit 3. A tape cassette 30 is detachably mounted in the cassette mounting section 5. In the following description, a tape cassette 30 that is mounted in the cassette mounting section 5 will be called the "mounted cassette." The tape cassette 30 is provided with a cassette case 31. The cassette case 31 accommodates the tape 40, and an ink ribbon (not illustrated). The tape 40 is configured of a long strip comprising layers arranged in the order of a base material, an adhesive layer, and a release paper. The surface of the base material on the side opposite the release paper is the printing surface. Objects are printed on the printing surface with the ink ribbon.

The tape cassette 30 has an identification part 32 provided on the front surface of the cassette case 31. The identification part 32 is configured of a combination of recesses formed in the surface thereof. The recesses form a pattern that varies according to the color of the ink ribbon (i.e., the color of the objects printed on the tape 40; hereinafter called the "printing color") and attributes of the tape 40 (hereinafter called the "tape attributes") accommodated in the cassette case 31. Various tape attributes are used in the present embodiment and include the width dimension of the tape 40 (hereinafter called the "tape width"), the color of the tape 40, and whether the tape 40 is a non-clear tape (a normal tape) having an opaque base material or a clear tape having a transparent or translucent base material. In the following description, information specifying the printing color and tape attributes will be called the "cassette information." The identification part 32 specifies the cassette information.

A ribbon take-up shaft 6, a tape drive shaft 7, and a thermal head 9 (see FIG. 3) are provided in the cassette mounting section 5. A conveying motor 16 provided in the tape printer 10 (see FIG. 3) drives the ribbon take-up shaft 6 to take up used ink ribbon and to convey unused ink ribbon. The conveying motor 16 also drives the tape drive shaft 7 to convey the tape 40. The thermal head 9 generates heat in order to print objects on the tape 40 using the ink ribbon. A cutting unit 8 is disposed on the left side of the tape drive shaft 7. A cutting motor 17 provided in the tape printer 10 (see FIG. 3) drives the cutting unit 8 to cut off the portion of the tape 40 on which objects have been printed, thereby creating a label.

Next, labels will be described with reference to FIGS. 2A and 2B. Labels in the present embodiment are categorized as base labels 41 and overlay labels 42. A composite label 49 is created by affixing overlay labels 42 to the printing surface of a base label 41. Thus, the base label 41 serves as the base, or bottom, of the composite label 49. Hereinafter, the tape 40 used for creating the base label 41 will be called the "base tape." In other words, the base label 41 is created by cutting the base tape after objects have been printed thereon. The tape 40 used for creating the overlay label 42 will be called the "overlay tape." In other words, the overlay labels 42 are created by cutting the overlay tape after objects have been printed thereon. The tape 40 is categorized as base tape and overlay tape according to the tape attributes. In the present embodiment, a non-clear tape is classified as the base tape, while a clear tape is classified as the overlay tape. Note that the clear tape may also be classified as base tape.

Figure 2A:
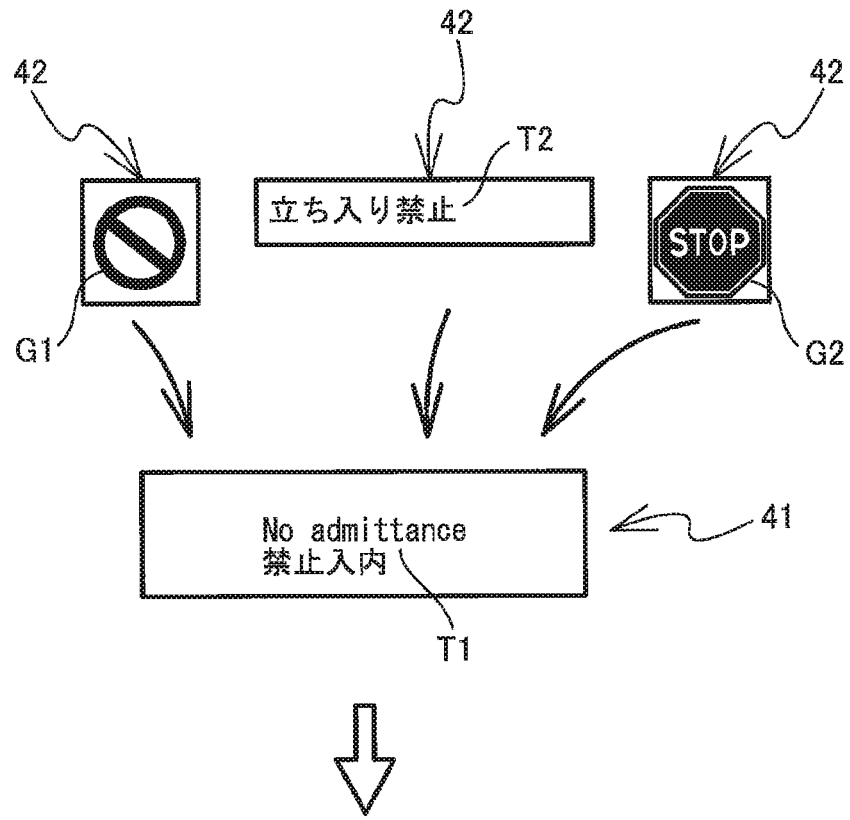
Figure 2B:
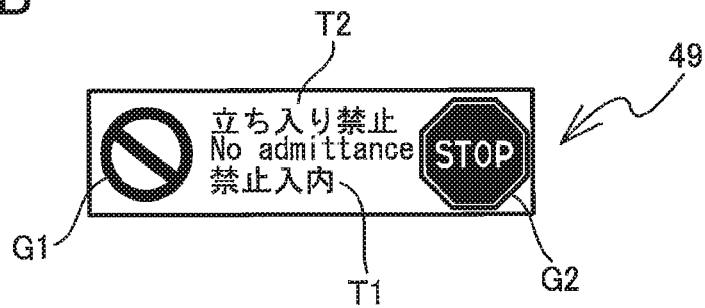

The example in FIG. 2A illustrates a white base label 41 on which is printed a text T1 in black which is written in English and Chinese, a clear overlay label 42 on which is printed a text T2 in blue which is written in Japanese, and two clear overlay labels 42 on which red graphics G1 and G2 are printed. FIG. 2B illustrates the composite label 49 created when the three overlay labels 42 are affixed to the base label 41. For convenience, all objects are rendered in black in FIGS. 2A and 2B and all labels are rendered in white. This depiction is also followed in FIGS. 6, 10, 11, 13, and 14.

Since the overlay labels 42 are transparent, the user can see the printing surface of the base label 41 through the overlay labels 42 when viewing the finished composite label 49. In this way, the printing system 1 can use a tape printer 10 having a simple configuration capable of printing only one color in each print to create a composite label 49 that appears to have objects in a plurality of colors (black, blue, and red in the example of FIGS. 2A and 2B) printed on a single label (i.e., a multicolored label).

Next, the electrical configuration of the tape printer 10 will be described with reference to FIG. 3. The tape printer 10 according to the present embodiment is provided with a central processing unit (CPU) 11. The CPU 11 functions as a processor for controlling the tape printer 10. In addition to the input unit 2, display unit 3, thermal head 9, conveying motor 16, and cutting motor 17 described above, the CPU 11 is electrically connected to a flash memory 12, a read only memory (ROM) 13, a random access memory (RAM) 14, a communication unit 15, and a reading device 18. The flash memory 12 stores programs executed by the CPU 11 and the like. The ROM 13 stores various parameters that the CPU 11 requires when executing the various programs. The RAM 14 stores various temporary data, such as print data received from the editing device 20. The communication unit 15 is a controller for communicating with the editing device 20 via the network 100. The reading device 18 is a sensor for reading cassette information from the identification part 32.

Next, the electrical configuration of the editing device 20 will be described. The editing device 20 is provided with a CPU 21. The CPU 21 functions as a processor for controlling the editing device 20. The CPU 21 is electrically connected to a flash memory 22, a ROM 23, a RAM 24, a communication unit 25, an input unit 26, a display unit 27, and a drive device 28. The flash memory 22 stores programs executed by the CPU 21, label data, and the like. The RAM 24 stores various temporary data. The ROM 23 stores various types of information that the CPU 21 needs when executing the various programs. The communication unit 25 is a controller for communicating with the tape printer 10 via the network 100. The input unit 26 includes a mouse, a keyboard, and the like. The user operates the input unit 26 to input various information into the editing device 20. The display unit 27 is a liquid crystal display capable of displaying color images. The display unit 27 displays various information including images based on edited print data. The drive device 28 can read information stored on a storage medium 28A. The storage medium 28A is a semiconductor memory, an optical disc, or the like. When the drive device 28 reads a main program stored on the storage medium 28A, the CPU 21 can store the main program in the flash memory 22.

Next, a main process executed by the CPU 21 of the editing device 20 will be described with reference to FIGS. 4 through 14. The CPU 21 starts the main process by executing a main program when a command to start the main process is inputted through the input unit 26. As a suitable example, the following description will cover the case of creating the composite label 49 illustrated in FIG. 2B. In the main process, the CPU 21 controls the editing of print data and the displaying of images based on edited print data. Also in the main process, the CPU 21 controls printing based on the edited print data and the displaying of images based on print control.

Figure 4:
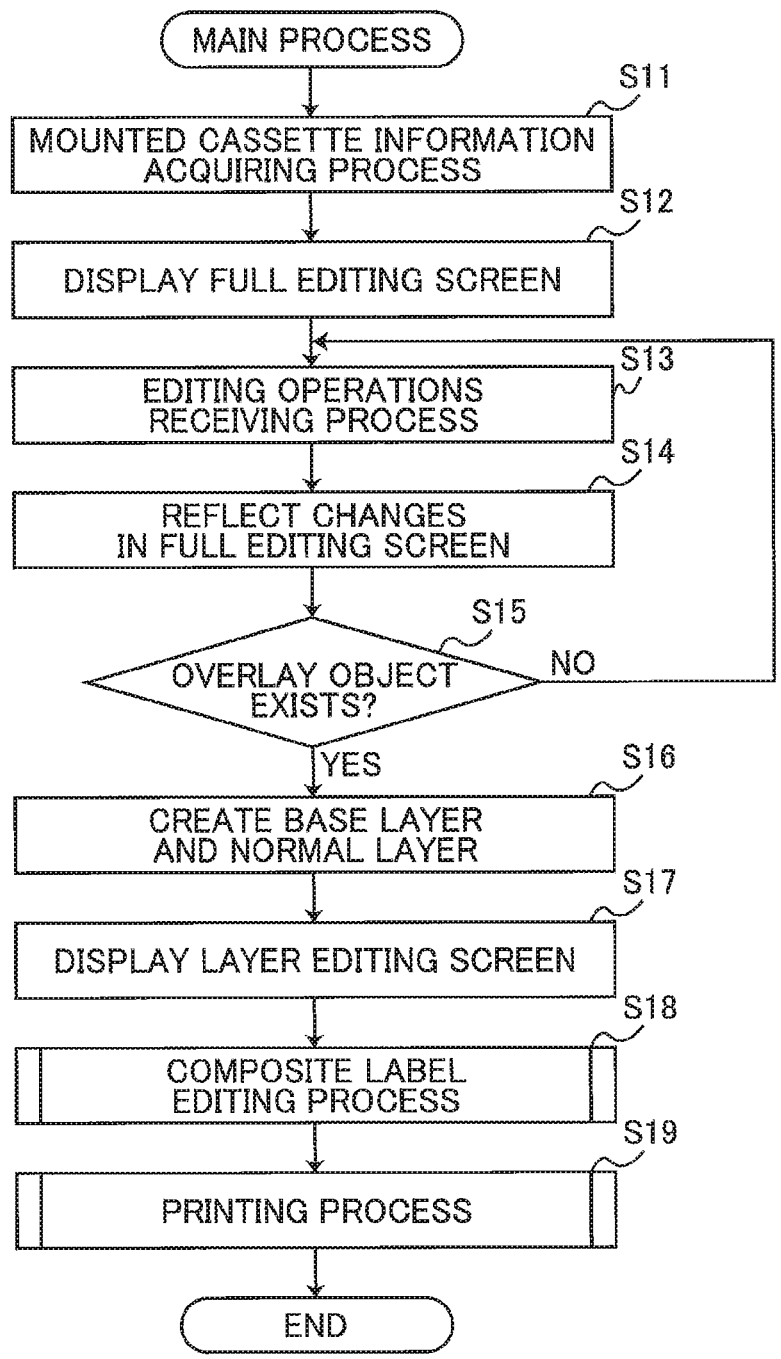
FIG. 4 is a flowchart illustrating steps in a main process executed by a CPU in the editing device according to the embodiment of the present disclosure.

In S1 at the beginning of the main process in FIG. 4, the CPU 21 performs a process to acquire mounted cassette information (mounted cassette information acquiring process). In the mounted cassette information acquiring process, the CPU 21 transmits a request to the tape printer 10 via the network 100, requesting cassette information on the mounted cassette (hereinafter called the "mounted cassette information"). When the tape printer 10 receives the request from the editing device 20, the CPU 11 reads the mounted cassette information from the identification part 32 (see FIG. 1) with the reading device 18 (see FIG. 3). The CPU 11 then transmits this mounted cassette information to the editing device 20 via the network 100. In this way, the CPU 21 of the editing device 20 acquires the mounted cassette information from the tape printer 10. Note that, when capable of communicating with a plurality of tape printers 10, the CPU 21 acquires mounted cassette information from each tape printer 10. If the CPU 21 cannot communicate with a tape printer 10 or if a tape cassette 30 is not mounted in the cassette mounting section 5 of the tape printer 10, the CPU 21 does not acquire mounted cassette information from the tape printer 10. If mounted cassette information is acquired, the CPU 21 stores the information in the RAM 24.

Figure 5:
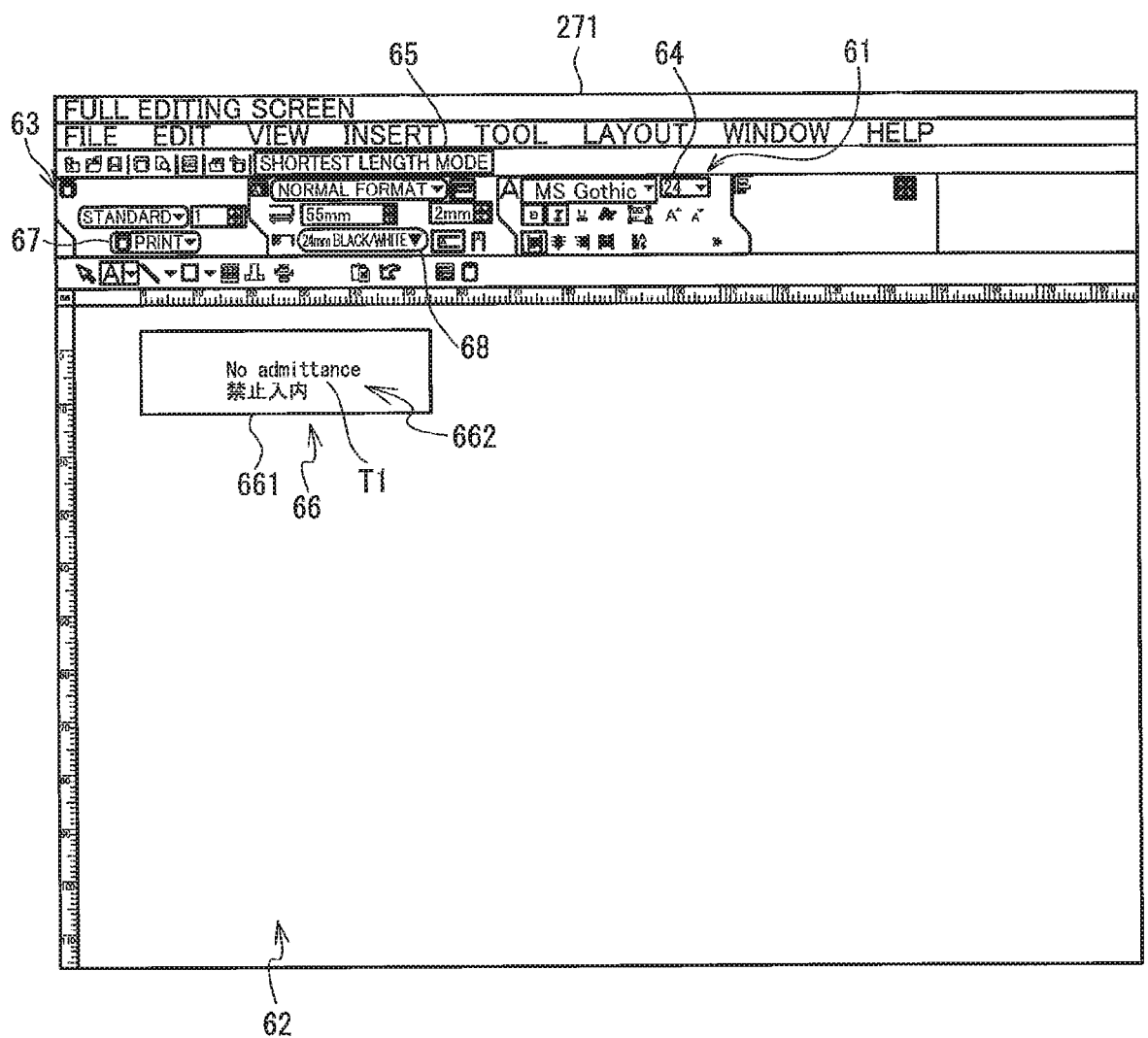
FIG. 5 is an explanatory diagram illustrating a full editing screen displayed on a display unit in the editing device according to the embodiment of the present disclosure.

In S12 the CPU 21 displays a full editing screen 271 (see FIG. 5) on the display unit 27. As illustrated in FIG. 5, the full editing screen 271 has sections 61, 62, and 63. Displayed within the section 61 area text size indicator 64, a print mode indicator 65, a textbox (not illustrated), a color indicator (not illustrated), a standard cassette information indicator 68, and the like that are operated to edit print data. The size of the text is displayed in the text size indicator 64. The user can modify this text size by operating the text size indicator 64 using the input unit 26. A print mode described later is displayed in the print mode indicator 65. The user can select a print mode suited to the user's purpose by operating the print mode indicator 65 using the input unit 26. The user can add text, graphics, or other objects through operations in the textbox and the like using the input unit 26. The user can also change the printing color for an object by operating the color indicator using the input unit 26.

Standard cassette information is displayed in the standard cassette information indicator 68. Standard cassette information is cassette information for a standard cassette. When mounted cassette information for a single mounted cassette was acquired in the mounted cassette information acquiring process of S11, the standard cassette denotes the tape cassette 30 corresponding to the acquired mounted cassette information (i.e., the mounted cassette). When mounted cassette information for a plurality of mounted cassettes was acquired in the mounted cassette information acquiring process of S11, the standard cassette denotes a default tape cassette 30. The default tape cassette 30 is a cassette provided with a black ink ribbon and a white non-clear tape having a tape width of 24 mm. If no mounted cassette information was acquired in the mounted cassette information acquiring process of S11, the standard cassette information represents the default tape cassette 30. In the example of FIG. 5, the information "24 mm BLACK/WHITE" is displayed in the standard cassette information indicator 68. Here, "24 mm" denotes the tape width, "BLACK" denotes the printing color, and "WHITE" denotes a white tape 40 (i.e., non-clear tape). The user can change the standard cassette by operating the standard cassette information indicator 68 with the input unit 26.

A composite label image 66 undergoing edit is displayed in the section 62. The composite label image 66 is a composite preview corresponding to the composite label 49 being created. When editing is initiated, a composite label image 66 corresponding to the standard cassette (i.e., a default composite label image 66) is displayed in section 62. The default composite label image 66 includes only a base label image 661. The base label image 661 depicts the outer shape of the base label with a solid line.

When editing operations are performed on the print data, the display of the composite label image 66 is modified to reflect the editing changes. For example, if an object is added, an image of the object is added to the composite label image 66. The object image renders the added object in the color specified by the color indicator. FIG. 5 illustrates a case in which the black text T1 was added as an object to be printed on the base tape (hereinafter called a "base object"). Here, the text T1 will be called an object image 662. By manipulating object images with the input unit 26, the user can move and delete objects.

A print button 67 and the like are displayed in the section 63 for initiating a printing operation. By selecting the print button 67, the user can execute a printing operation on the tape printer 10.

In S13 of FIG. 4, the CPU 21 performs a process to receive editing operations (editing operations receiving process). Here, the user can perform operations in the full editing screen 271 using the input unit 26 to edit the print data. Specifically, as described above, the user can edit print data by: selecting a print mode; adding and deleting objects; and changing the shapes, positions, sizes, and printing colors of objects. The print modes include a shortest length mode, and a fewest prints mode. While these will be described later in greater detail, the shortest length mode controls the tape printer 10 to create an overlay label 42 for each object, while the fewest prints mode controls the tape printer 10 to create an overlay label 42 for all objects having the same printing color. In the example of FIG. 5, the shortest length mode is set as the print mode at the start of the editing process. In the editing operations receiving process of S13, the CPU 21 receives editing operations for print data through the input unit 26. The CPU 21 stores various types of information corresponding to the editing operations received for print data in the RAM 24. This information includes information specifying the print mode, and information related to objects.

In S14 the CPU 21 reflects the changes made to the print data in the full editing screen 271. For example, when the black text T1 is added as a base object as described above, the CPU 21 adds the object image 662 to the composite label image 66, as illustrated in FIG. 5.

In S15 the CPU 21 determines whether an overlay object exists on the basis of the information that was stored in the RAM 24 in the editing operations receiving process of S13. An overlay object is any object printed on overlay tape and has a printing color that differs from the printing color of the base object. In the present embodiment, when the standard cassette has non-clear tape as a tape attribute, the CPU 21 determines that any object with a printing color different from the printing color of the standard cassette is an overlay object. If the standard cassette has clear tape as a tape attribute, the CPU 21 determines that any object having the same printing color as the printing color of the standard cassette is an overlay object. When the standard cassette has non-clear tape as the tape attribute and the printing color of the standard cassette is black as in the example of FIG. 5, the CPU 21 determines that there are no overlay objects if there are no objects with a printing color other than black (S15: NO). In this case, the CPU 21 returns to S13.

Figure 6:
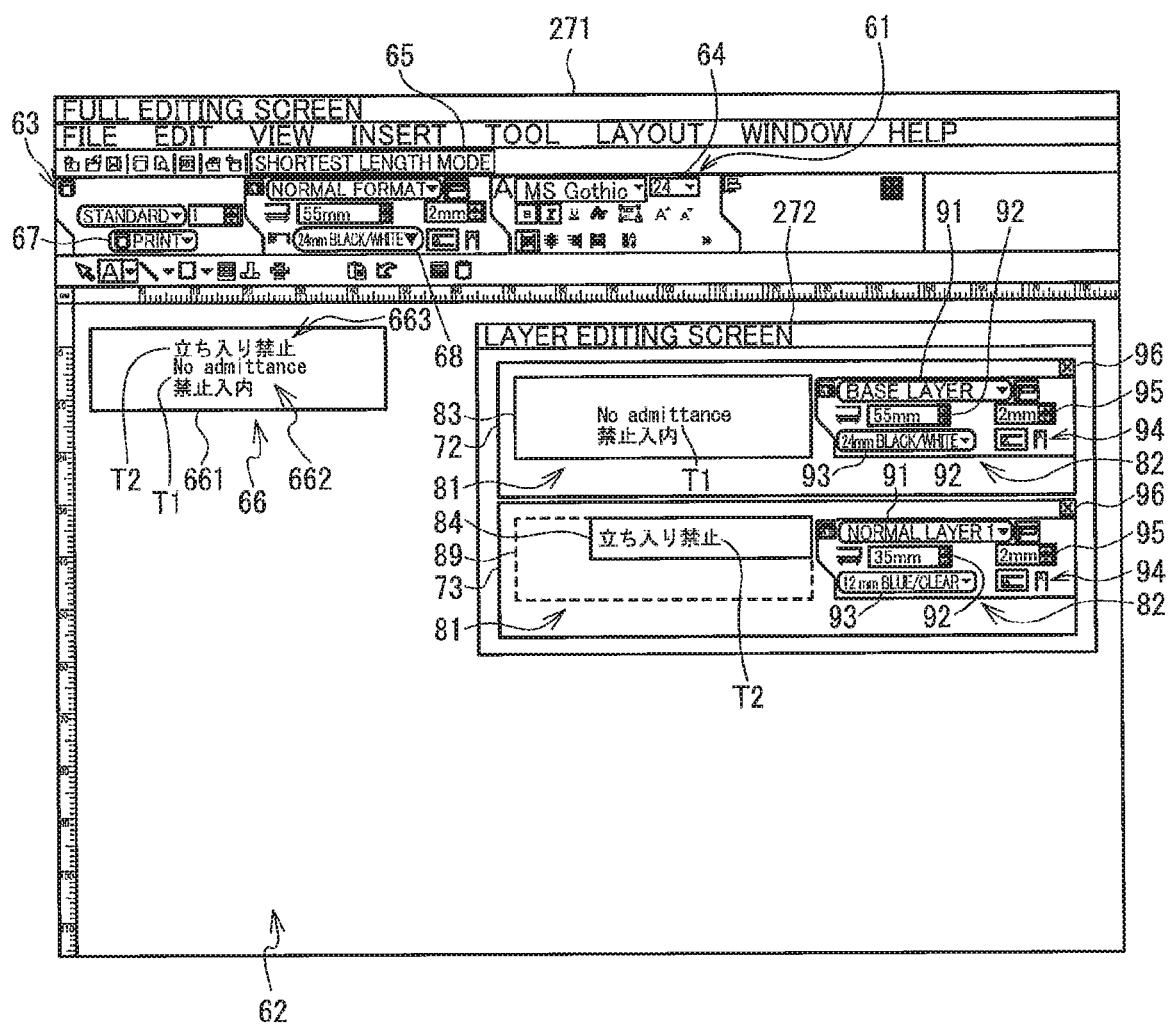
FIG. 6 is an explanatory diagram illustrating the full editing screen and a layer editing screen superimposed thereon displayed on the display unit in the editing device according to the embodiment of the present disclosure.

When the blue text T2 is added to the print data in the state illustrated in FIG. 5, for example, in S14 an object image 663 is added to the composite label image 66, as illustrated in FIG. 6. Since the standard cassette has the tape attribute non-clear tape and the printing color of the added text (blue) differs from the printing color of the standard cassette (black), the CPU 21 determines in S15 of FIG. 4 that an overlay object exists (S15: YES). In this case, in S16 the CPU 21 creates a base layer and a normal layer. In S16 the CPU 21 categorizes the layer corresponding to the base object as the base layer and the layer corresponding to the overlay object as the normal layer, and stores these layers in the RAM 24. In other words, the CPU 21 assigns the objects to one of the base tape (base layer) and overlay tape (normal layer).

In S17 the CPU 21 displays a layer editing screen 272 (see FIG. 6) on the display unit 27 based on the base layer and normal layers created in S16. At this time, the layer editing screen 272 is superimposed on the full editing screen 271. As illustrated in FIG. 6, the layer editing screen 272 is provided with a layer screen for each layer. In this example, the blue text T2 was added to the display illustrated in FIG. 5. Accordingly, layer screens 72 and 73 are provided in the layer editing screen 272. The layer screen 72 corresponds to the base layer, and the layer screen 73 to a normal layer 1. In the present embodiment, the layer screen that corresponds to the base label 41 (the base layer) is displayed in the topmost position among the plurality of layer screens. Layer screens corresponding to overlay labels 42 (normal layers) are displayed in descending order below the layer screen corresponding to the base label 41 according to the order that the overlay labels 42 are affixed to the base label 41. In this way, the editing device 20 can reduce the possibility that the user will mistake the order in which overlay labels 42 are affixed to the base label 41.

A label display area 81 is provided in the left portion of each of the layer screens 72 and 73. A label image corresponding to each layer is displayed in the corresponding label display area 81. The label image is a preview of the layer being created and indicates the label being edited for the corresponding layer. In the example of FIG. 6, a label image 83 is displayed in the label display area 81 of the layer screen 72, and a label image 84 is displayed in the label display area 81 of the layer screen 73. A base label border 89 is displayed in the label display area 81 of the layer screen 73 for a normal layer. The base label border 89 is a dashed line that indicates the outer shape of the base label 41. The position of the label image relative to the base label border 89 corresponds to the position at which the overlay label 42 will be affixed to the base label 41. Hence, the user can readily comprehend the position at which the overlay label 42 is affixed to the base label 41 on the basis of the position of the label image relative to the base label border 89.

An operating area 82 is provided in the right portion of each of the layer screens 72 and 73. Displayed in the operating area 82 are a layer name indicator 91, a label length indicator 92, a selected cassette information indicator 93, an orientation indicator 94, a margin indicator 95, a Delete button 96, and the like that the user can operate to edit the print data. The layer name (base layer, normal layer 1, etc.) is displayed in each layer name indicator 91. Thus, by checking the layer name indicator 91, the user can distinguish the base layer from the normal layers. The label length is displayed in the label length indicator 92. Label length indicates the longitudinal dimension of the label. By operating the label length indicator 92 using the input unit 26, the user can adjust the label length.

The selected cassette is displayed in each selected cassette information indicator 93. The selected cassette is the tape cassette 30 that the user selects from a plurality of candidate tape cassettes 30 by operating the selected cassette information indicator 93. The selected cassette information is cassette information corresponding to the selected cassette. The selected cassette is the tape cassette 30 that will be used for printing. Hence, the user can select a tape cassette 30 to be used in printing by operating the selected cassette information indicator 93 using the input unit 26. In the example of FIG. 6, "24 mm BLACK/WHITE" is displayed in the selected cassette information indicator 93 of the layer screen 72, and "12 mm BLUE/CLEAR" is displayed in the selected cassette information indicator 93 of the layer screen 73. Here, "24 mm" and "12 mm" denote the tape widths; "BLACK" and "BLUE" denote the printing colors; "WHITE" denotes a white tape 40 (i.e., a non-clear tape); and "CLEAR" denotes a clear tape.

Cassette information for the plurality of candidate tape cassettes 30 is pre-stored in the flash memory 22. Tape cassettes 30 with clear tape are classified as candidate tape cassettes 30 for normal layers. Tape cassettes 30 with non-clear tape are classified as candidate tape cassettes 30 for the base layer. When the cassette information for the plurality of candidate tape cassettes 30 includes cassette information identical to the mounted cassette information acquired in S11, the cassette information identical to the mounted cassette information acquired in S11 is displayed in the selected cassette information indicator 93 as the selected cassette information at the beginning of the editing process. In this way, the editing device 20 eliminates the user's need to confirm the mounted cassette.

An orientation is displayed in the orientation indicator 94. Orientation will be described later. The length of margins provided on both longitudinal (the left-right direction in FIGS. 2A and 2B) ends of the tape 40 is displayed in the margin indicator 95. The user can modify the margin length by operating the margin indicator 95 using the input unit 26. The Delete button 96 is provided in the upper-right corner of the operating area 82. By selecting the Delete button 96 with the input unit 26, the user can delete the layer corresponding to the selected Delete button 96.

In S18 of FIG. 4, the CPU 21 executes a composite label editing process. In S19 the CPU 21 performs a printing process. The CPU 21 subsequently ends the main process.

Next, the composite label editing process will be described with reference to FIGS. 7 through 11. In S21 at the beginning of the process in FIG. 7, the CPU 21 performs a process to receive editing operations (editing operations receiving process). Here, in addition to the full editing screen 271, the user can perform operations in the layer editing screen 272 using the input unit 26 to edit print data. Specifically, in addition to the editing operations described in S13, the user can perform the editing operations on print data, such as changing the selected cassette and deleting layers, as described above. In the editing operations receiving process of S21, the CPU 21 receives editing operations for print data through the input unit 26. On the basis of the operations received in S21 for editing the print data, the CPU 21 stores various types of information in the RAM 24. This information includes information specifying the print mode, information related to objects, and information on the selected cassette.

In S22 the CPU 21 determines whether an editing operation has been performed on print data in the full editing screen 271 according to operations received in the editing operations receiving process of S21. When an editing operation has been performed on print data in the full editing screen 271 (S22: YES), the CPU 21 advances to S31 and performs a process corresponding to the editing operation. However, if an editing operation has been performed on print data in the layer editing screen 272 and not on print data in the full editing screen 271 (S22: NO), the CPU 21 advances to S51 in FIG. 8 and performs a process corresponding to the editing operation in the layer editing screen 272.

First, the process will be described for a case in which an operation has been performed in the full editing screen 271 to edit print data. In S31 the CPU 21 determines whether an overlay object has been added on the basis of the information stored in the RAM 24 in S21. When an overlay object has been added (S31: YES), in S32 the CPU 21 creates a normal layer.

Subsequently, in S61 of FIG. 9 the CPU 21 references the RAM 24 to determine whether the print mode is the shortest length mode. If the print mode is the shortest length mode (S61: YES), in S62 the CPU 21 creates a separate layer for each overlay object. By using the shortest length mode, the editing device 20 consumes less overlay tape than when using the fewest prints mode. Subsequently, the CPU 21 advances to S64.

When the print mode is the fewest prints mode and not the shortest length mode (S61: NO), in S63 the CPU 21 creates layers such that all overlay objects having the same printing color are in the same layer. In this way, the editing device 20 can create one overlay label 42 for all objects of each printing color. Accordingly, the editing device 20 can print a plurality of overlay objects in a single print, provided that the objects have the same printing color, thereby printing faster and with fewer prints than when using the shortest length mode. Subsequently, the CPU 21 advances to S64. Each time the user adds an object having a printing color that differs from the printing colors of all previously added objects (hereinafter called "objects of a new printing color"), the CPU 21 creates a new layer for the objects of the new printing color.

In S64 that CPU 21 performs a process to determine the orientation (orientation determining process). In this description, "orientation" denotes the direction in which the tape 40 is arranged relative to the displayed object image. Orientations include a parallel orientation and an orthogonal orientation. The parallel orientation is an orientation in which the left-right direction of the object image displayed on the display unit 27 is aligned with the longitudinal direction of the tape 40. The orthogonal orientation is an orientation in which the left-right direction of the object image displayed on the display unit 27 is aligned with the width direction of the tape 40.

In the orientation determining process of S64, the CPU 21 determines whether the overlay object can be printed within a printing area on the overlay tape using the selected cassette when the orientation is the parallel orientation and when the orientation is the orthogonal orientation. If the overlay object can be printed within the printing area of the overlay tape, the CPU 21 determines whether the created overlay label 42 will run off the base label 41 when affixed thereto. In the following description, the expression "printing acceptable" will be used for cases in which the overlay object can be printed within the printing area on the overlay tape and when the overlay label 42 will not extend off the base label 41 when the overlay label 42 is created and affixed to the base label 41. If printing is not acceptable, i.e., if the overlay object cannot be printed within the printing area on the overlay tape, or if the overlay object can be printed within the printing area but the overlay label 42 will extend off the base label 41 when the overlay label 42 is created and affixed to the base label 41, the term "printing unacceptable" will be used for such cases. When printing is acceptable, the CPU 21 calculates the shortest length in the longitudinal direction of the overlay label 42. In other words, when printing is acceptable, the CPU 21 calculates the length of the overlay tape required for printing the overlay object in the printing area of the overlay tape. At this time, the CPU 21 also accounts for the size of the margins displayed in the margin indicator 95.

In S65 the CPU 21 determines whether printing is unacceptable with the selected cassette in both the parallel and orthogonal orientations according to the determination results in S64. If printing is unacceptable in both orientations (S65: YES), in S66 the CPU 21 stores the layer subjected to the determination in S64 in the RAM 24 as a warning-targeted layer. In S71 the CPU 21 reflects the modification to the print data in the editing screen. Specifically, the CPU 21 adds an object image representing the added overlay object to the composite label image 66. The CPU 21 also displays a layer screen corresponding to the normal layer created in S32. Next, the CPU 21 issues a warning by displaying a warning icon 99 (see FIG. 10) in the layer screen in association with the warning-targeted layer stored in the RAM 24. Subsequently, the CPU 21 returns to the main process in FIG. 4.

Figure 10:
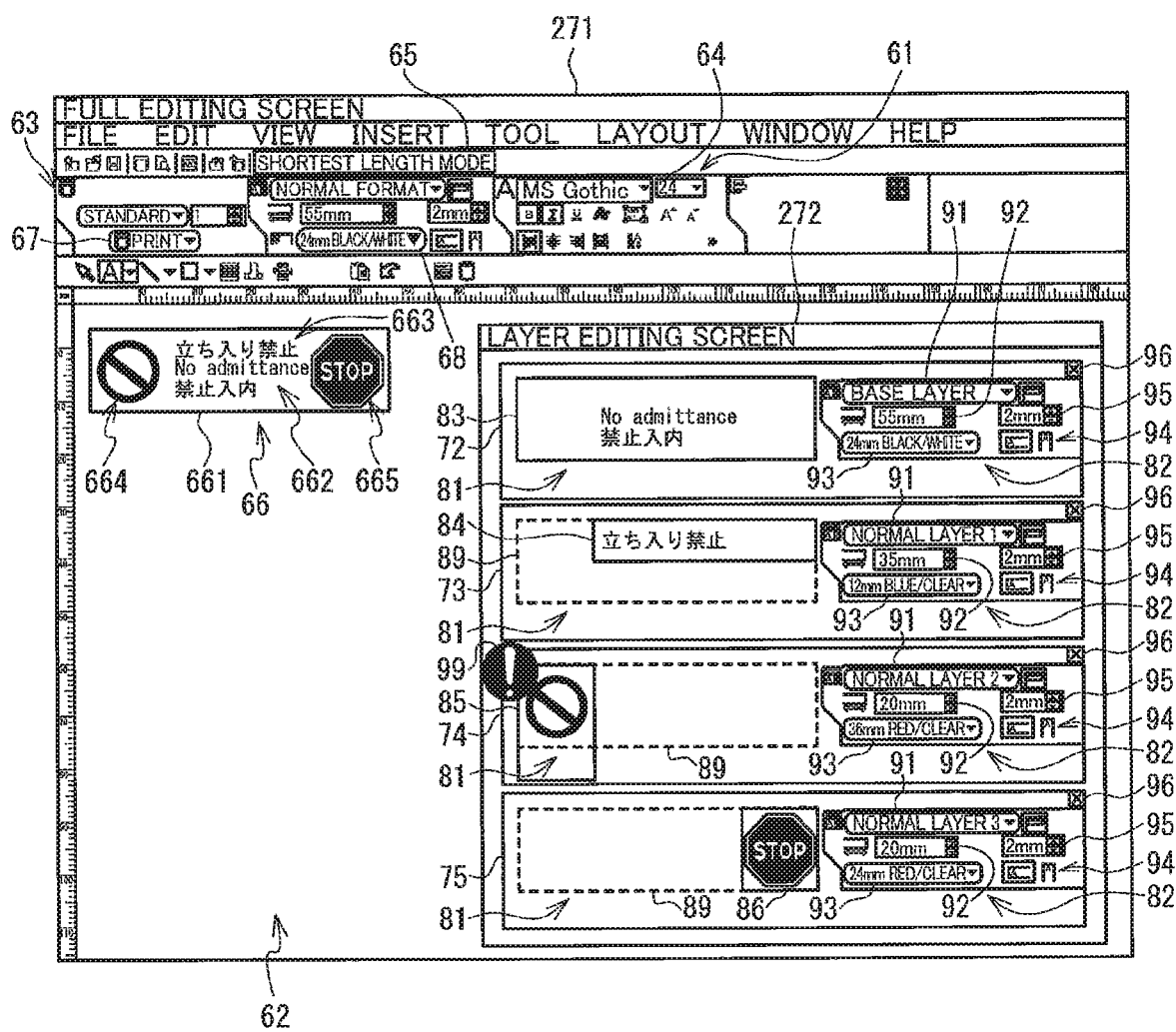
FIG. 10 is an explanatory diagram illustrating the full editing screen, and the layer editing screen and a warning icon superimposed thereon displayed on the display unit in the editing device according to the embodiment of the present disclosure.

In this example, a red graphic is added to the left portion of the composite label image 66 as an overlay object. When this graphic is added, in S71 the CPU 21 adds an object image 664 to the composite label image 66, as illustrated in FIG. 10. The CPU 21 also displays a layer screen 74 for a normal layer 2 and displays a label image 85 in the label display area 81 of the layer screen 74. FIG. 10 illustrates a case in which the overlay label 42 for the normal layer 2 will run off the base label 41 when affixed thereto, regardless of whether the overlay label 42 is in the parallel orientation or the orthogonal orientation. In other words, FIG. 10 illustrates a case in which the normal layer 2 is a warning-targeted layer. In this case, the warning icon 99 is displayed on the layer screen 74 in association with normal layer 2. By indicating a warning-targeted layer using the warning icon 99, the editing device 20 can notify the user that the selected cassette corresponding to the warning-targeted layer ("36 mm RED/CLEAR" in FIG. 10) must be changed to a tape cassette 30 with which printing is acceptable. In response, the user operates the selected cassette information indicator 93 of the layer screen 74 through the input unit 26 to change the selected cassette from "36 mm RED/CLEAR" to "24 mm RED/CLEAR," for example.

Figure 9:
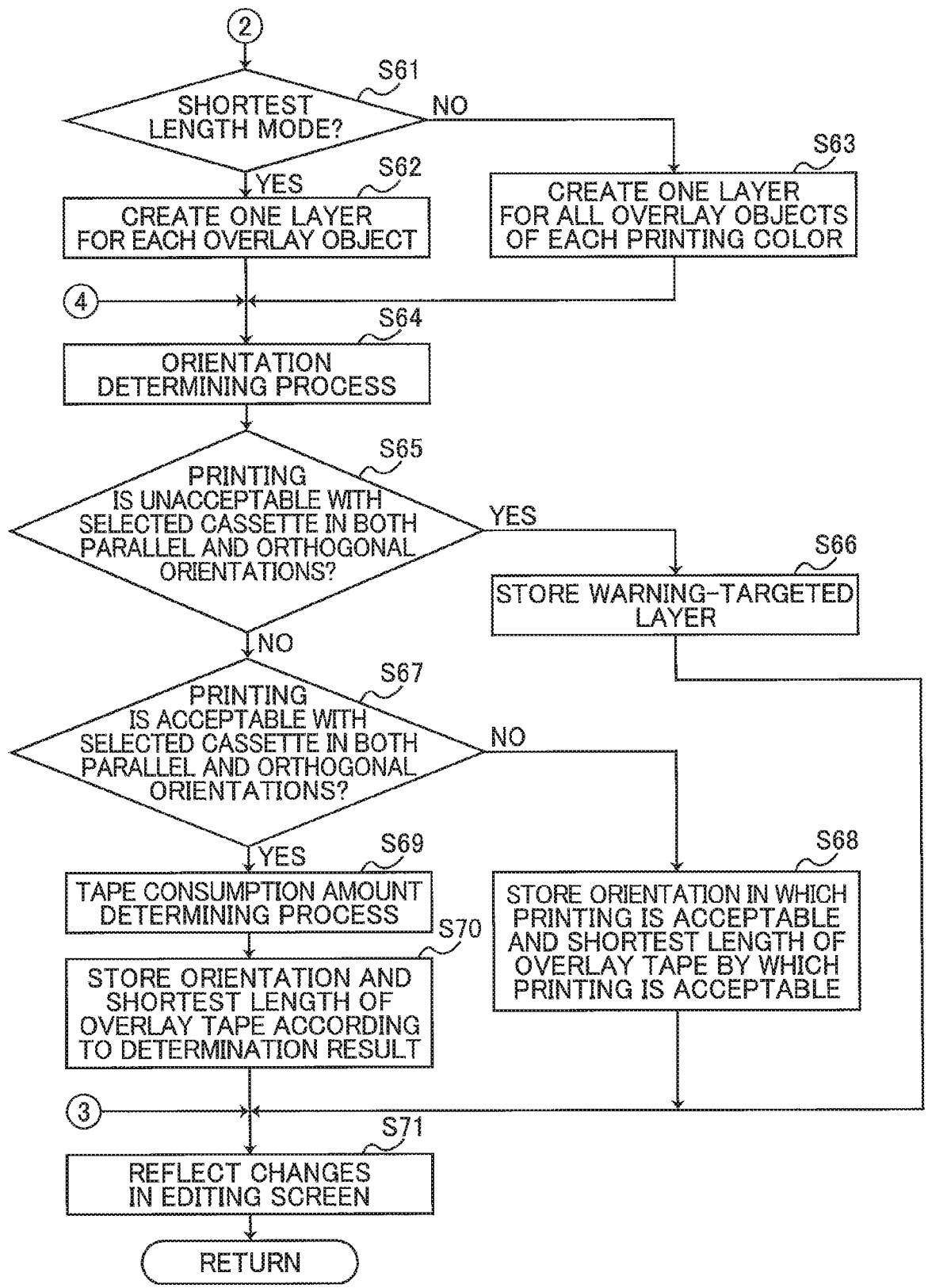
FIG. 9 is a flowchart illustrating remaining part of steps in the composite label editing process executed by the CPU in the editing device according to the embodiment of the present disclosure.

As illustrated in FIG. 9, when printing is acceptable using the selected cassette for at least one of the parallel orientation and orthogonal orientation (S65: NO), in S67 the CPU 21 determines whether printing is acceptable using the selected cassette in both the parallel and orthogonal orientations according to the determination results in the orientation determining process of S64. If printing with the selected cassette is only acceptable using one of the parallel orientation and orthogonal orientation (S67: NO), in S68 the CPU 21 stores the orientation in which printing is acceptable and the shortest length of the overlay tape by which printing is acceptable in the RAM 24. Subsequently, in S71 the CPU 21 reflects the changes to the print data in the editing screen. Specifically, the CPU 21 adds an object image representing the added object to the composite label image 66. Next, the CPU 21 displays a layer screen corresponding to the normal layer created in S32. Here, the CPU 21 sets the orientation indicator 94 (see FIG. 10) for the layer that was the subject of the determination in the orientation determining process of S64 according to the orientation stored in the RAM 24. The CPU 21 also sets the label length indicator 92 for the layer subject to the determination in S64 (see FIG. 10) according to the value stored in the RAM 24 indicating the shortest length of the overlay tape by which printing is acceptable.

In this example, a red graphic is also added to the right portion of the composite label image 66 as an overlay object. When this graphic is added, in S71 the CPU 21 adds an object image 665 to the composite label image 66, as illustrated in FIG. 10. When the print mode is the shortest length mode, the CPU 21 displays a layer screen 75 corresponding to a normal layer 3 and displays a label image 86 in the label display area 81 of the layer screen 75 and displays a label image 86 in the label display area 81 of the layer screen 75. FIG. 10 illustrates a case in which the selected cassette "24 mm RED/CLEAR" corresponding to the normal layer 3 is acceptable to print in the parallel orientation. In this case, the CPU 21 performs a display indicating that the parallel orientation has been set in the orientation indicator 94 for the normal layer 3. The CPU 21 also displays "20 mm" in the label length indicator 92 for the normal layer 3 as the label length.

When printing is acceptable using the selected cassette in both the parallel and the orthogonal orientations (S67: YES), in S69 the CPU 21 performs a process to determine the quantity of tape consumption (tape consumption amount determining process). In the tape consumption amount determining process, the CPU 21 compares the length of overlay tape that will be consumed using the selected cassette (i.e., the consumption amount) between cases in which the orientation is the parallel orientation and in which the orientation is the orthogonal orientation. The consumption amount denotes the shortest length of the overlay tape calculated in S64 by which printing is acceptable.

In S70 the CPU 21 stores the orientation determined in the tape consumption amount determining process of S69 to consume the least amount of overlay tape and the shortest length of overlay tape needed for printing to be acceptable in the RAM 24. In S71 the CPU 21 reflects the changes made to the print data in the editing screen. Specifically, the CPU 21 displays the added objects as described above (adds an object image and a layer screen). The CPU 21 also reflects the orientation stored in the RAM 24 in the orientation indicator 94 (see FIG. 10) corresponding to the layer that was subject to the determination in S64, and displays the shortest length of the overlay tape at which printing becomes acceptable in the label length indicator 92.

Figure 7:
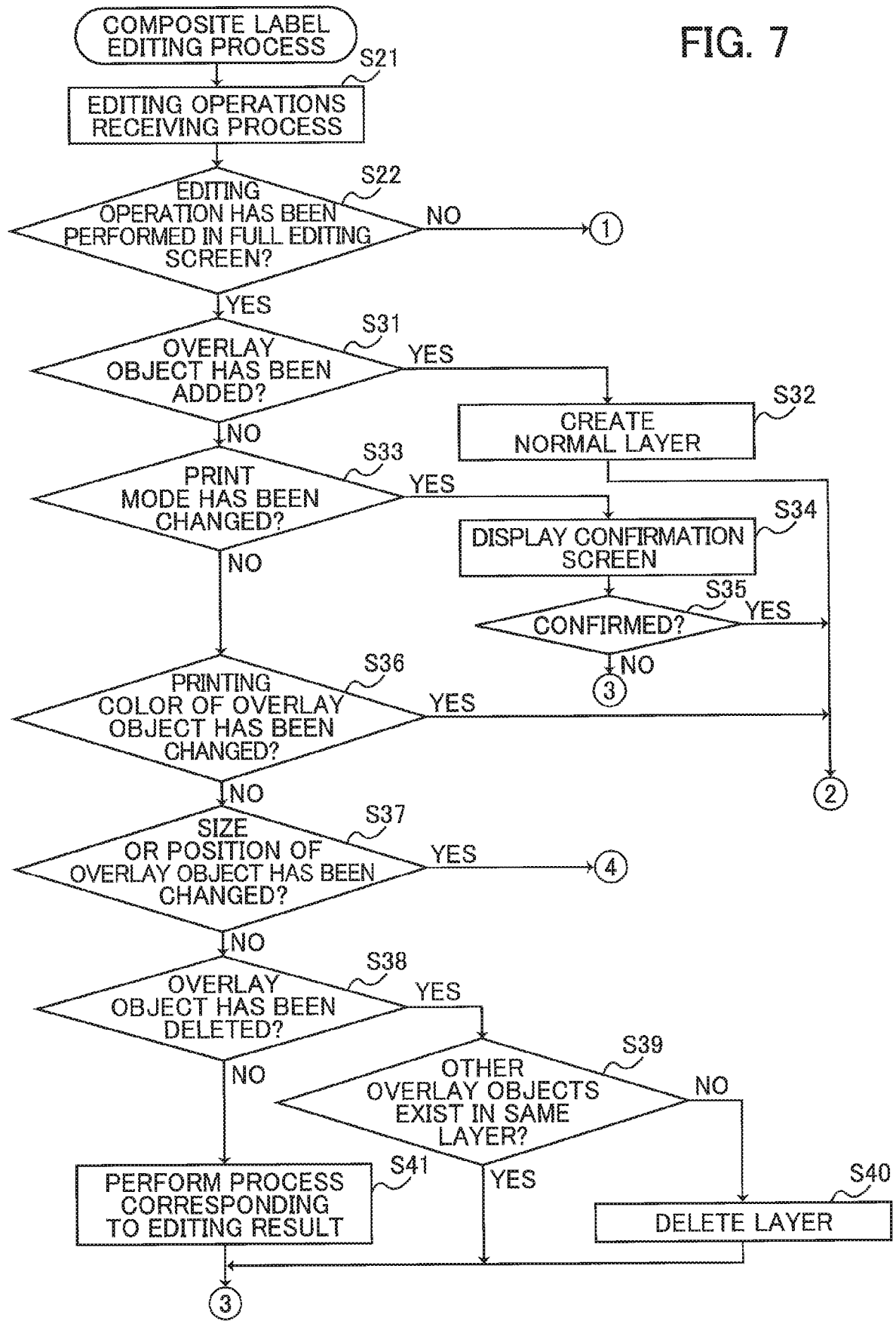
FIG. 7 is a flowchart illustrating a part of steps in a composite label editing process executed by the CPU in the editing device according to the embodiment of the present disclosure.
Figure 11:
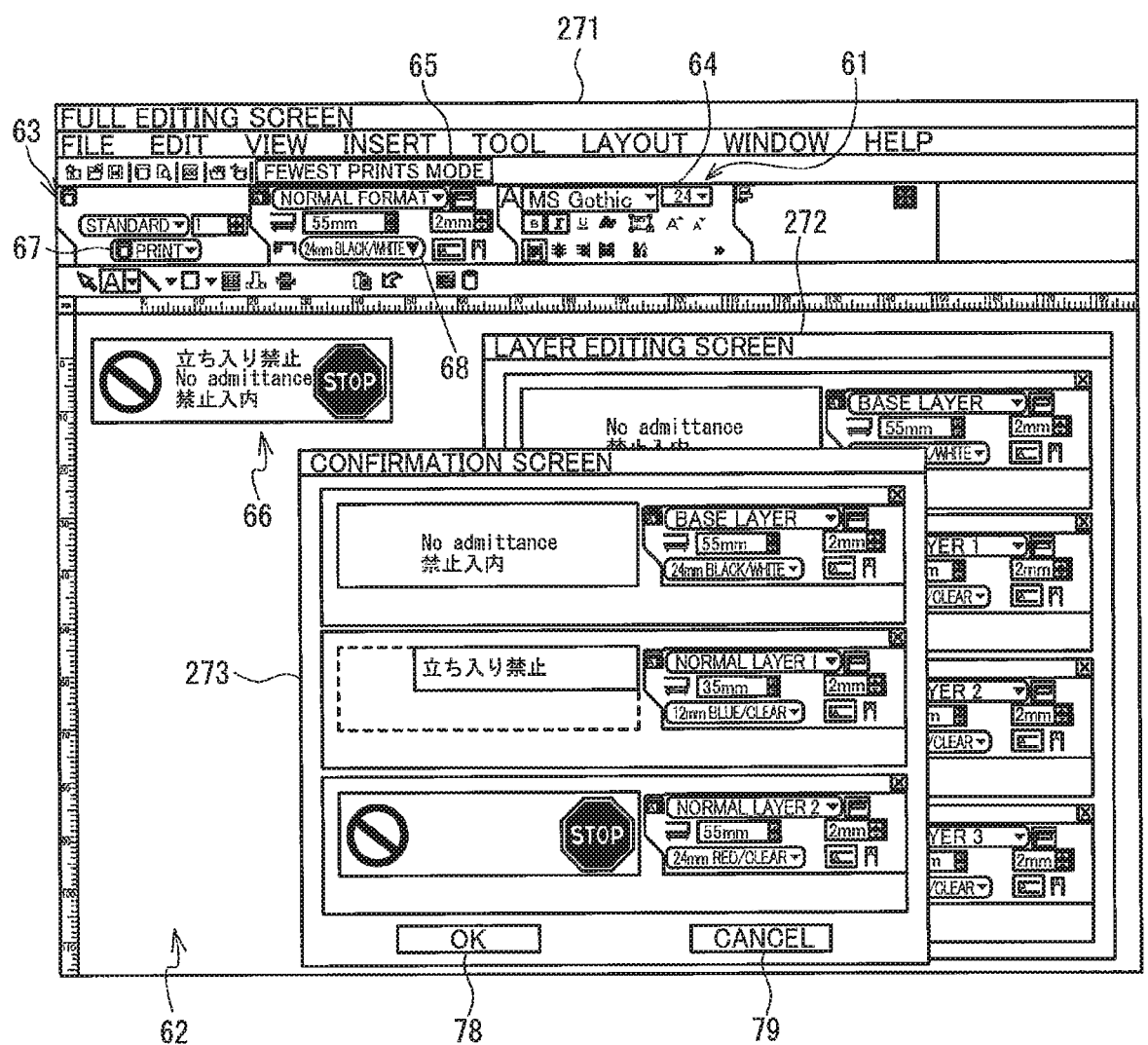
FIG. 11 is an explanatory diagram illustrating the full editing screen, and the layer editing screen and a confirmation screen superimposed thereon displayed on the display unit in the editing device according to the embodiment of the present disclosure.

If the CPU 21 determines in S31 of FIG. 7 that an overlay object has not been added (S31: NO), in S33 the CPU 21 determines whether the print mode has been changed on the basis of the information that was stored in the RAM 24 in the editing operations receiving process of S21. If the print mode has been changed (S33: YES), in S34 the CPU 21 displays a confirmation screen 273 (see FIG. 11) on the display unit 27 over the full editing screen 271 and layer editing screen 272. As illustrated in FIG. 11, the confirmation screen 273 indicates the content of the layer editing screen 272 when the print mode was changed. In this example, the print mode has been changed from the shortest length mode in FIG. 10 to the fewest prints mode. Accordingly, the confirmation screen 273 indicates the content of the layer editing screen 272 after integrating normal layer 2 and normal layer 3 of FIG. 10. An OK button 78 and a CANCEL button 79 are provided in the bottom of the confirmation screen 273. The user can confirm the change to the print mode by selecting the OK button 78 using the input unit 26 or can cancel the change by selecting the CANCEL button 79 using the input unit 26.

In S35 of FIG. 7, the CPU 21 determines whether the change to the print mode has been confirmed according to whether the OK button 78 or the CANCEL button 79 has been selected. When the user selected the CANCEL button 79 using the input unit 26 (S35: NO), the CPU 21 cancels the change made to the printing mode. In this case, neither the correlations between the overlay objects and the normal layers nor the tape orientations are changed. Accordingly, the CPU 21 advances to S71 of FIG. 9 and returns the editing screen to its state prior to the print mode being changed.

On the other hand, if the user selected the OK button 78 using the input unit 26 (S35: YES), the CPU 21 confirms the change made to the print mode. When the print mode is changed, there may also be changes to correspondences between overlay objects and normal layers (one normal layer for each overlay object or one normal layer for each set of overlay objects having the same printing color) and to the orientations (parallel orientation or orthogonal orientation) for each normal layer. Accordingly, the CPU 21 advances to S61 of FIG. 9 and performs the process described above from S61 for each of the normal layers. In S71 the CPU 21 updates the print mode indicator 65, updates, according to changes in orientation, the label images, the label length indicators 92, the orientation indicators 94, and the like.

On the other hand, if the CPU 21 determines in S33 that the print mode has not been changed (S33: NO), in S36 the CPU 21 determines whether the printing color of an overlay object has been changed on the basis of the information that was stored in the RAM 24 in the editing operations receiving process of S21. If the printing color of an overlay object has been changed (S36: YES), there may also be changes to correspondences between overlay objects and normal layers (layers being integrated or separated) and to orientations. Accordingly, the CPU 21 advances to S61 of FIG. 9 and repeats the process described above from S61. In S71 the CPU 21 then modifies the color of the object images, integrates or separates layer screens in conformance with the integration or separation of their layers, changes the colors of the label images, updates the label length indicators 92, updates the orientation indicators 94, and the like.

However, if there have been no changes made to the printing colors of overlay objects (S36: NO), in S37 the CPU 21 determines whether the size or position of an overlay object has been changed on the basis of the information that was stored in the RAM 24 in the editing operations receiving process of S21. When the size or position of an overlay object has been changed (S37: YES), there will be no changes to correspondences between overlay objects and normal layers, but there is a chance that the orientation will change. Accordingly, the CPU 21 advances to S64 in FIG. 9 and performs the process described above from S64. In S71 the CPU 21 modifies the positions or sizes of the object images, modifies the label images, updates the label length indicators 92, updates the orientation indicators 94, and the like.

However, if there have been no changes to the sizes and positions of overlay objects (S37: NO), in S38 the CPU 21 determines whether an overlay object has been deleted on the basis of the information that was stored in the RAM 24 in the editing operations receiving process of S21. When an overlay object has been deleted (S38: YES), in S39 the CPU 21 determines whether other overlay objects still exist in the normal layer from which the overlay object has been deleted. If there remains another overlay object in the normal layer from which the overlay object has been deleted (S39: YES), in S71 of FIG. 9 the CPU 21 deletes the object image corresponding to the deleted overlay object from the full editing screen 271 and modifies the label image in the normal layer from which the overlay object has been deleted.

However, if no overlay object remains in the normal layer from which the overlay object has been deleted (S39: NO), in S40 the CPU 21 deletes the normal layer having no overlay objects (i.e., the normal layer whose overlay object was determined in S38 to have been deleted) from the RAM 24. In S71 of FIG. 9, the CPU 21 then deletes the object image for the corresponding deleted overlay object from the full editing screen 271 and deletes the layer screen for the deleted normal layer from the layer editing screen 272.

However, if the CPU 21 determines in S38 that no overlay objects have been deleted (S38: NO), in S41 the CPU 21 performs a process corresponding to the information that was stored in the RAM 24 in the editing operations receiving process of S21. Subsequently, the CPU 21 advances to S71.

Next, a description will be given of processes performed when operations to edit print data were executed in the layer editing screen 272. If an editing operation has been performed on print data in the layer editing screen 272 (S21) and not on print data in the full editing screen 271 (S22: NO), in S51 of FIG. 8, the CPU 21 determines whether a selected cassette has been changed. If a selected cassette has been changed (S51: YES), in S52 the CPU 21 determines whether the modified selected cassette is the selected cassette for the base layer. If the modified selected cassette is the selected cassette for a normal layer and not for the base layer (S52: NO), the CPU 21 advances to S61 of FIG. 9. However, if the modified cassette is the selected cassette for the base layer (S52: YES), in S53 the CPU 21 stores a base label border 89 (see FIG. 6) corresponding to the size of the tape 40 (tape width and label length) provided in the new selected cassette in the RAM 24. Subsequently, the CPU 21 advances to S61 in FIG. 9.

Here, the CPU 21 must advance to S61 of FIG. 9 to perform the process described above from S61 because the correlations between overlay objects and normal layers and the tape orientations may change when the selected cassette is changed. In S71 of FIG. 9, the CPU 21 modifies the base label borders 89 or the label images in the layer editing screen 272, updates the label length indicators 92, updates the orientation indicators 94, and the like.

Figure 8:
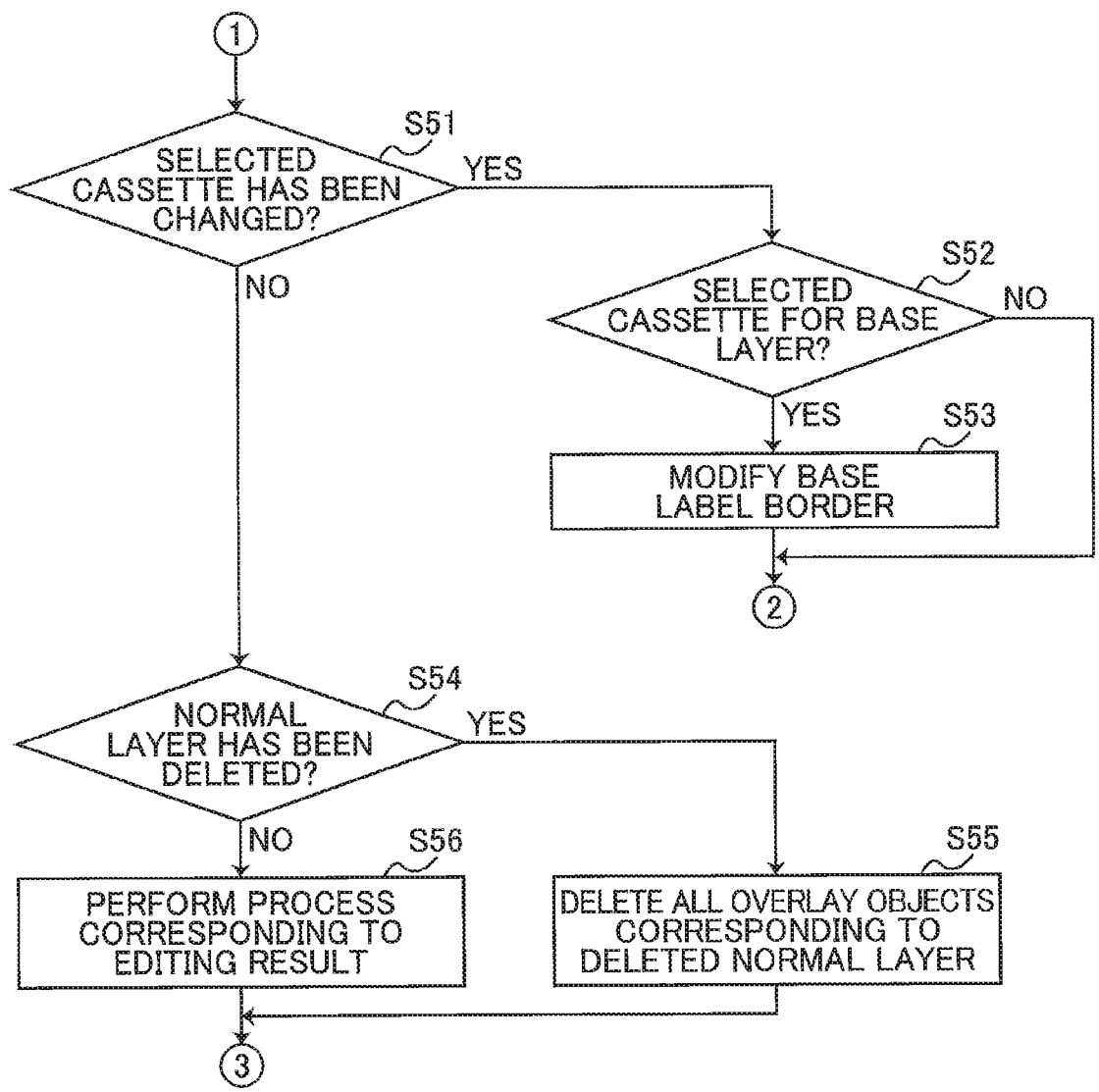
FIG. 8 is a flowchart illustrating another part of steps in the composite label editing process executed by the CPU in the editing device according to the embodiment of the present disclosure.

However, if the CPU 21 determines in S51 of FIG. 8 that a selected cassette has not been changed (S51: NO), in S54 the CPU 21 determines whether a normal layer has been deleted on the basis of the information that was stored in the RAM 24 in the editing operations receiving process of S21. If a normal layer has been deleted (S54: YES), in S55 the CPU 21 deletes all overlay objects corresponding to the deleted normal layer from the RAM 24. In this case, neither correlations between overlay objects and normal layers nor orientations will have changed. Therefore, the CPU 21 advances to S71 of FIG. 9. In S71 the CPU 21 deletes the object images representing the deleted overlay objects from the full editing screen 271, and deletes the layer screen corresponding to the deleted layer from the layer editing screen 272.

On the other hand, if a normal layer has not been deleted (S4: NO), in S56 the CPU 21 performs a process based on the information that was stored in the RAM 24 in the editing operations receiving process of S21, and subsequently advances to S71 in FIG. 9.

Next, the printing process will be described with reference to FIG. 12. The user selects the print button 67 (see FIG. 10) using the input unit 26 in order to input a print command into the editing device 20 for executing a printing operation on the tape printer 10. In S81 at the beginning of the printing process, the CPU 21 acquires the print command inputted via the input unit 26. In S82 the CPU 21 displays a print preview 274 (see FIG. 13) on the display unit 27.

Figure 13:
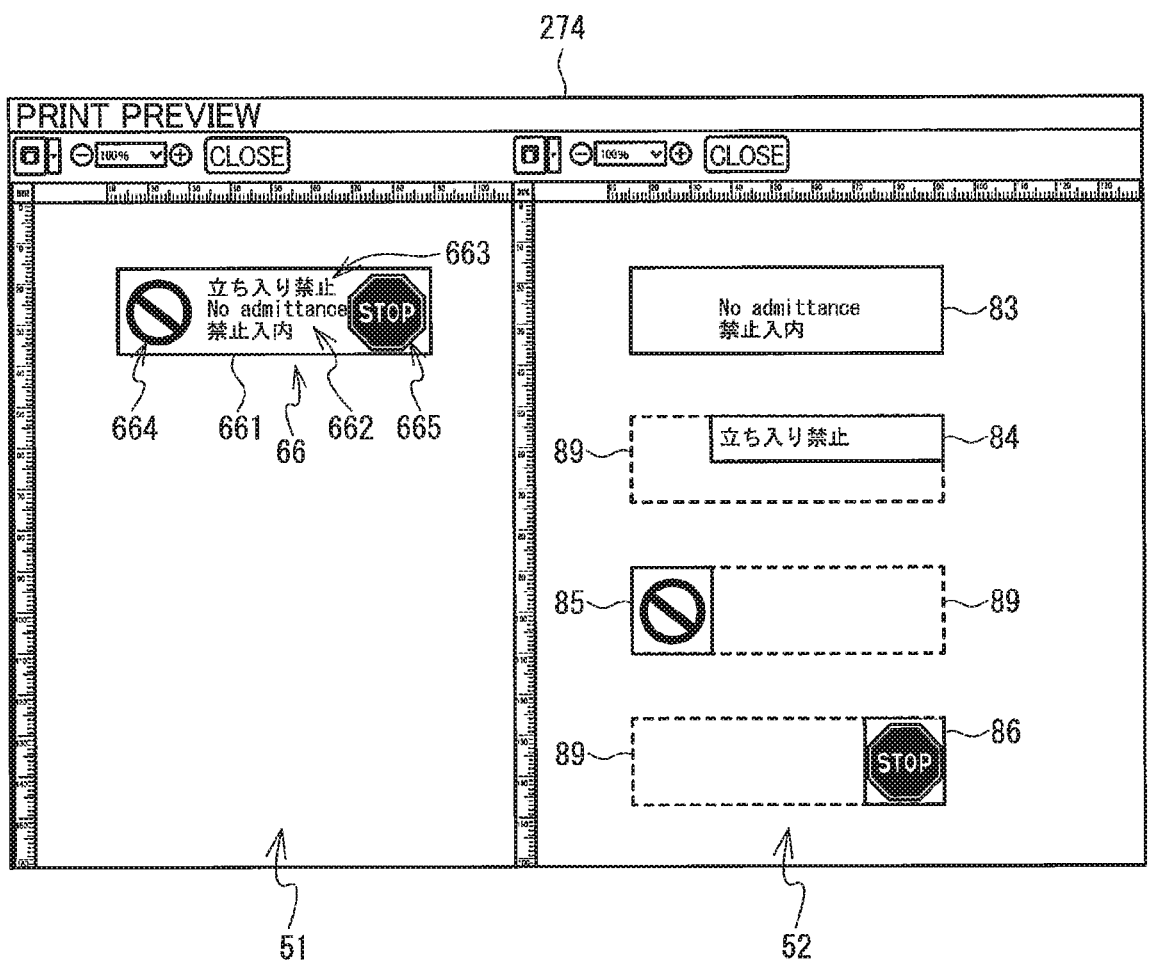
FIG. 13 is an explanatory diagram illustrating a print preview displayed on the display unit of the editing device before the printer performs printing operation.
Figure 14:
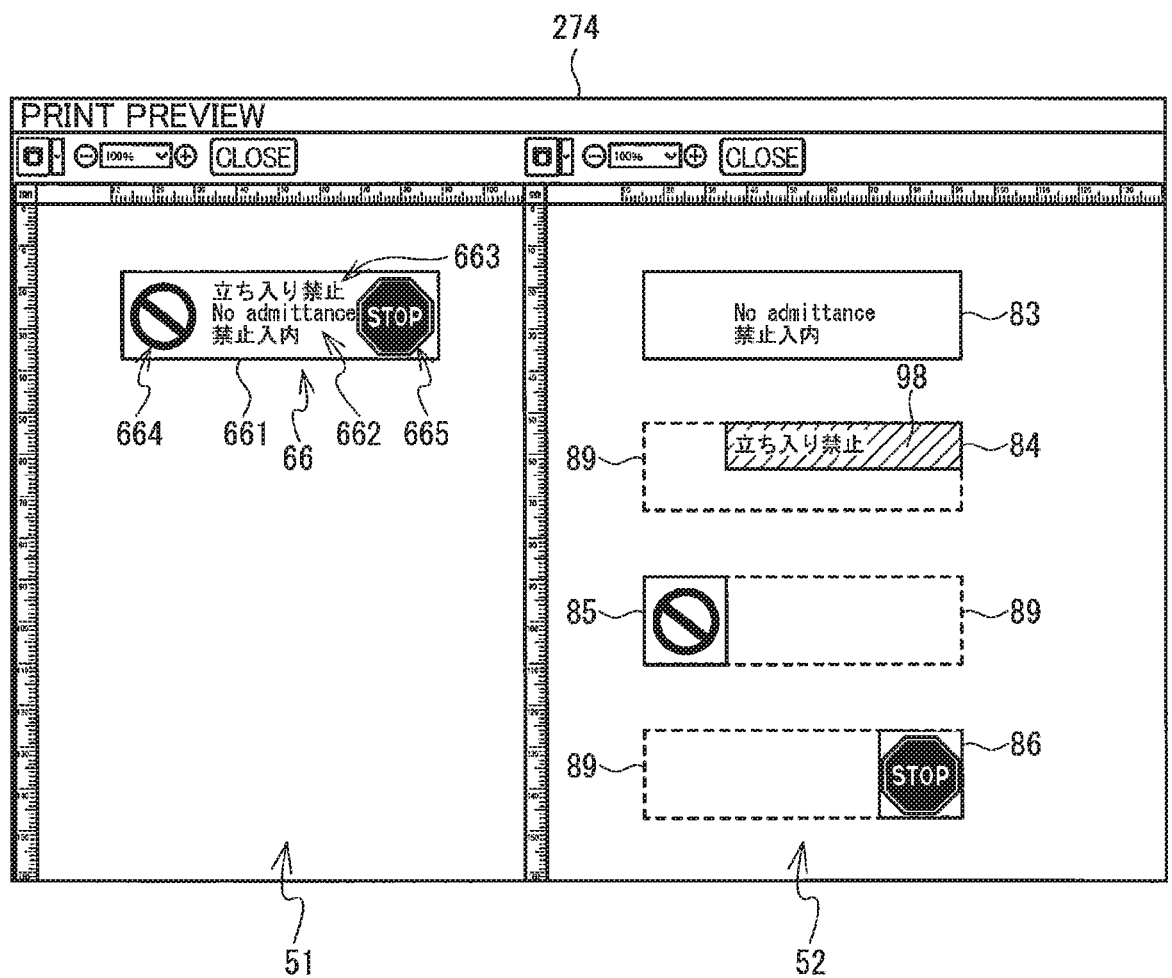
FIG. 14 is an explanatory diagram illustrating the print preview displayed on the display unit of the editing device while the printer performs printing operation.

As illustrated in FIG. 13, the print preview 274 has a left section 51 arranged in the left portion of the print preview 274, and a right section 52 arranged in the right portion of the print preview 274. The composite label image 66 is displayed in the left section 51. The label images 83, 84, 85, and 86 for each corresponding layer are displayed one after another in the right section 52. A base label border 89 is displayed for each of the label images 84, 85, and 86 corresponding to the normal layers. In the present embodiment, the label image 83 corresponding to the base label 41 (the base layer) is displayed at the top of the label images 83, 84, 85, and 86. The label images 84, 85, and 86 corresponding to the overlay labels 42 (the normal layers) are displayed beneath the label image 83 for the base label 41 in the order that the overlay labels 42 will be affixed to the base label 41. In the present embodiment, label images corresponding to layers already printed are displayed so as to be distinguishable from label images for unprinted layers. Specifically, shading 98 is displayed in the label image 84 when the layer corresponding to the label image 84 has been printed, as illustrated in FIG. 14.

Figure 12:
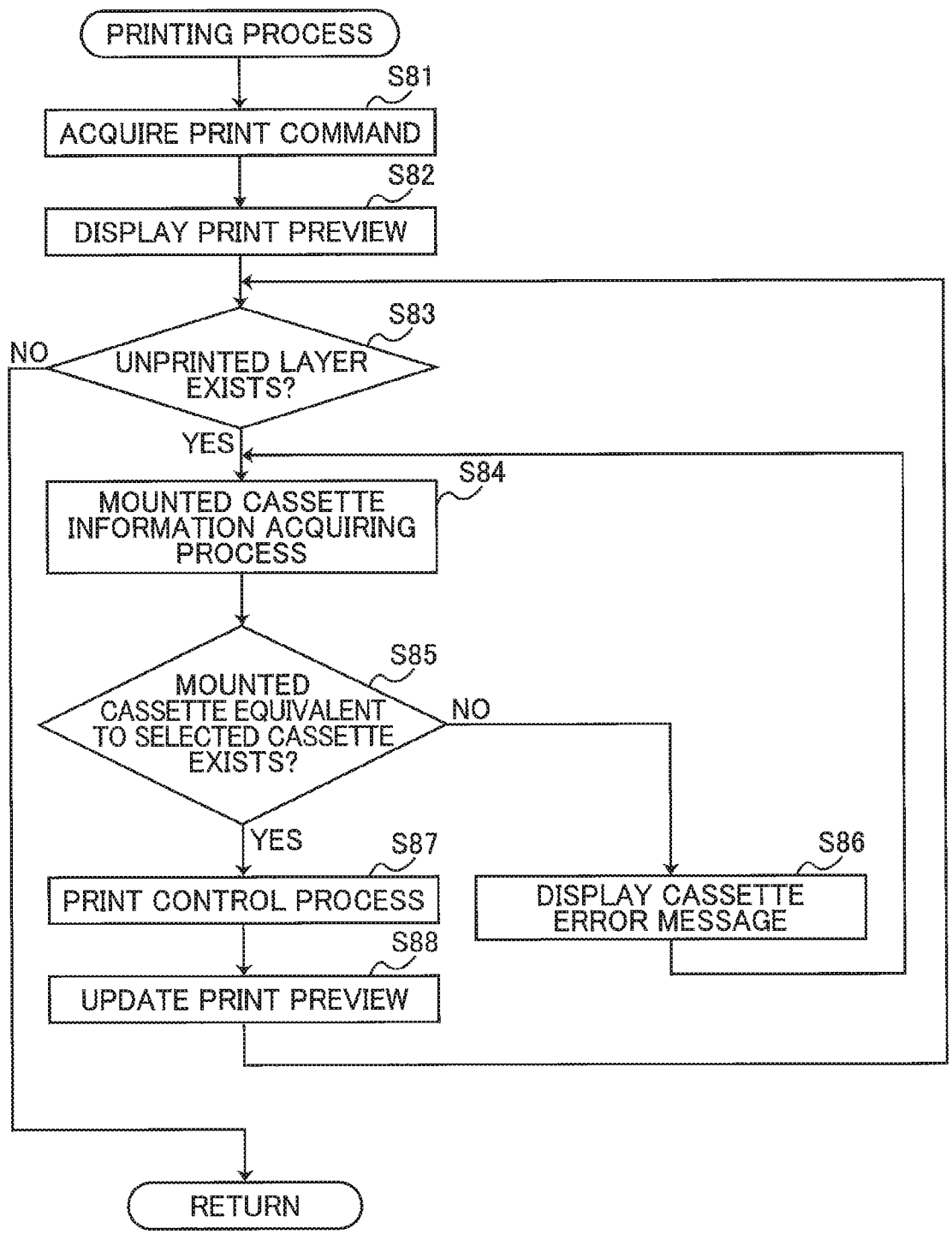
FIG. 12 is a flowchart illustrating steps in a printing process executed by the CPU in the editing device of the embodiment of the present disclosure.

In S83 of FIG. 12, the CPU 21 determines whether there remain any unprinted layers. When there remains a label image without the shading 98, as in the example of FIG. 14, the CPU 21 determines that an unprinted layer exists (S83: YES). In S84 the CPU 21 performs a process to acquire mounted cassette information (mounted cassette information acquiring process). In this process, the CPU 21 acquires mounted cassette information in the same manner described in S11 of FIG. 4. If the CPU 21 can communicate with a plurality of tape printers 10 at this time, the CPU 21 acquires mounted cassette information from each tape printer 10. The CPU 21 stores the mounted cassette information in the RAM 24 in association with the corresponding tape printer 10.

In S85 the CPU 21 selects one of the unprinted layers as a target layer to be printed and determines for the target layer whether one of the mounted cassettes respectively corresponding to the mounted cassette information acquired in S84 matches the selected cassette corresponding to the selected cassette information that was selected for the target layer in S13 of FIG. 4 or S21 of FIG. 7. If none of the mounted cassettes is the same as the selected cassette for the target layer (S85: NO), in S86 the CPU 21 displays a cassette error message (not illustrated) on the display unit 27. For example, the CPU 21 displays the cassette error message "Please mount a 12-mm blue/clear tape cassette," prompting the user to mount a tape cassette 30 equivalent to the selected cassette in the cassette mounting section 5. Subsequently, the CPU 21 returns to S84.

When amounted cassette equivalent to the selected cassette exists (S85: YES), in S87 the CPU 21 performs a print control process for the target layer. In the print control process, the CPU 21 transmits print data for printing the target objects corresponding to the target layer to the tape printer 10 via the network 100. In other words, the CPU 21 transmits print data for the label image corresponding to the target layer displayed on the display unit 27 to the tape printer 10 via the network 100. When the tape printer 10 receives print data from the editing device 20, the CPU 11 performs a printing operation based on the print data. Through this process, the tape printer 10 can create a label for the target layer.

In S88 the CPU 21 updates the print preview 274. Specifically, the CPU 21 updates the print preview 274 so as to display additional shading 98 in the label image corresponding to the target layer. At this time, the CPU 21 displays shading 98 in all label images corresponding to the layers that have been printed in S87 (the layers for which print data have been outputted). For example, if the layer corresponding to the label image 84 was printed in S87, in S88 the CPU 21 displays shading 98 over the label image 84 (see FIG. 14). In this way, the user can easily recognize what layers have not been printed. Subsequently, the CPU 21 returns to S83.

In this way, the CPU 21 performs process of S84 through S88 for each unprinted layer. Through this process, the tape printer 10 can create a label for each layer. Specifically, the tape printer 10 can create an overlay label for each object when the print mode is the shortest length mode, and can create an overlay label for each set of objects having the same printing color when the print mode is the fewest prints mode. Note that the tape printer 10 can create a single base label regardless of whether the print mode is the shortest length mode or the fewest prints mode.

Once shading 98 has been displayed over the label images of all layers in the print preview 274 updated in S88, the CPU 21 determines there are no unprinted layers remaining (S83: NO). In this case, the CPU 21 returns to the main process of FIG. 4.

As described above, the user can select one of the shortest length mode and fewest prints mode as the print mode. By selecting the shortest length mode, the user can create an overlay label 42 for each object, thereby reducing the quantity of overlay tape consumed for printing. When selecting the fewest prints mode, the user can create an overlay label 42 for each set of objects having the same printing color. In this way, if a plurality of objects has the same printing color, all objects with the same printing color can be printed at one time. Accordingly, when the fewest prints mode has been selected, printing can be performed quickly, as fewer prints are required than in the shortest length mode. The user can switch modes according to the intended purpose.

Objects are assigned to one of the base layer (base tape) and normal layer (overlay tape) according to the tape attributes and printing color acquired in S11 for the mounted cassette, and the printing color acquired in S13 or S21. Hence, the editing device 20 eliminates the user's need to assign objects to one of the base tape and overlay tape.

Layer screens are displayed on the display unit 27. Consequently, the user can be made aware of the sizes and shapes of the overlay labels 42 as print data is being edited on the editing device 20.

When the fewest prints mode has been set, a plurality of layers corresponding to objects of the same printing color are combined, and a single layer screen corresponding to the combined layers is displayed on the display unit 27. In this way, the editing device 20 eliminates the user's need to combine layer screens.

When the shortest length mode has been set, layers are separated by object, and a layer screen corresponding to each of the separated layers is displayed on the display unit 27. In this way, the editing device 20 can eliminate the user's need to separate layer screens.

When an object is deleted from a layer having a single object, the layer whose object was deleted is also deleted, and the layer screen corresponding to the deleted layer is removed from the display unit 27. Accordingly, the editing device 20 can eliminate the user's need to delete unnecessary layer screens.

Each layer screen includes a label image and a base label border 89. Thus, the user can easily recognize the positions of overlay labels 42 relative to the base label 41 when creating a composite label 49 with overlay labels 42 to be affixed to the base label 41. Accordingly, the editing device 20 can reduce the possibility of overlay labels 42 being affixed to the base label 41 at unsuitable positions when the user creates a composite label 49.

In the print preview 274, label images for layers whose print data has already been outputted to the tape printer 10 are displayed in a manner that differentiates them from label images corresponding to layers whose print data has not yet been outputted to the tape printer 10. In this way, the editing device 20 can indicate the progress of printing to the user.

In the embodiment described above, the display unit 27 is an example of the display in the present disclosure. The process to edit the print data in the main process is an example of the (a) editing of the present disclosure. The process to acquire an object in S13 of FIG. 4 and S21 of FIG. 7 is an example of the (a1) acquiring of the present disclosure. The process to acquire the printing color of the object in S13 of FIG. 4 and S21 of FIG. 7 is an example of the (a2) determining of the present disclosure. The process to acquire the standard cassette information in S13 of FIG. 4 and the process to acquire the selected cassette information in S21 of FIG. 7 are an example of the (a3) acquiring of the present disclosure. The process in S16 of FIG. 4 and S32 of FIG. 7 is an example of the (a4) categorizing of the present disclosure. The tape cassette 30 accommodating the tape 40 corresponding to the layer subjected to the determination in S64 of FIG. 9 is an example of the target tape cassette of the present disclosure. The process to store the orientation and the shortest length of the overlay tape by which printing is acceptable in the RAM 24 is an example of the (a5) setting of the present disclosure. The process to confirm the change to the print mode is an example of the (a6) setting of the present disclosure. The process to control the display unit 27 to display the full editing screen thereon in S12 and S14 of FIG. 4 and S71 of FIG. 9 is an example of the (b) displaying.

The process in S11 of FIG. 4 is an example of the (a7) acquiring of the present disclosure. The process of S16 of FIG. 4 and S32 of FIG. 7 is an example of the (a8) creating of the present disclosure. The process in S17 of FIG. 4 and S71 of FIG. 9 is an example of the (b1) displaying of the present disclosure. The process in S63 of FIG. 9 is an example of the (a9) combining of the present disclosure. The process in S38 of FIG. 7 is an example of the (a10) receiving of the present disclosure. The process in S40 of FIG. 7 is an example of the (a11) deleting of the present disclosure. The process in S71 of FIG. 9 is an example of the (b2) deleting of the present disclosure. The label images 84, 85, and 86 are an example of the image of corresponding one of the at least one overlay label of the present disclosure. The process in S81 of FIG. 12 is an example of the (c) receiving of the present disclosure. The process in S82 and S88 of FIG. 12 is an example of the (d) displaying of the present disclosure. The process in S87 of FIG. 12 is an example of the (e) outputting of the present disclosure.

While the description has been made in detail with reference to specific embodiments thereof, it would be apparent to those skilled in the art that many modifications and variations may be made thereto. For example, the present embodiment describes an example in which print data is newly generated and edited, but print data already in the process of editing may be read from the flash memory 22 to be further edited. If the print data under edit includes overlay objects in this case, the editing device 20 may display the full editing screen 271 and layer editing screen 272 on the display unit 27 based on the print data under edit.

In the print preview 274 according to the present embodiment described above, label images are displayed in the order that the overlay labels 42 are to be affixed to the base label 41. However, the label images may instead be arranged in the print preview 274 in the order that they will be printed.

The editing device 20 may also be configured to change the order of layers when the user operates the layer name indicators 91 using the input unit 26. The order of layers corresponds to the order in which the overlay labels 42 are affixed to the base label 41. Depending on whether the order between a base layer and a normal layer was changed or the order among normal layers was changed, the processes performed afterward differ. Specifically, if the order of a base layer and a normal layer was changed, changes could also occur to the selected cassette, orientation, label length, base label border 89, and the like for each of all layers. In such a case, the CPU 21 performs the process beginning from S61 in FIG. 9 for all layers. If the order among normal layers is changed, the CPU 21 simply changes the display positions of the layer screens. The user may also modify the order of layers by using the input unit 26 to change the displayed positions of the corresponding layer screens, for example.

In the embodiment described above, the layer editing screen 272 is displayed over the full editing screen 271, but the layer editing screen 272 and full editing screen 271 may be displayed side-by-side on the display unit 27. Alternatively, the layer editing screen 272 may be omitted and layer screens may be displayed in section 62 of the full editing screen 271. Additionally, the displayed format of the base label border 89 is not limited to that described in the embodiment. The base label border 89 may be represented by a solid line, for example, or may be omitted altogether.

In the embodiment described above, label images corresponding to layers that have been printed are displayed in the print preview 274 so as to be distinguishable from label images corresponding to unprinted layers. Specifically, shading 98 is displayed over label images corresponding to printed layers. Alternatively, the label images corresponding to printed layers may be greyed out, highlighted with a continuous or blinking light, identified with a "printed" mark, or deleted from the print preview 274.

The usage history of the tape cassette 30 may be accumulated in the flash memory 12 or flash memory 22. In such a case, the CPU 21 may specify candidates for tape cassettes 30 to be displayed in the selected cassette information indicator 93 on the basis of their usage histories stored in the flash memory 12 or flash memory 22. At the start of an editing process, information on the tape cassette 30 with the most usage history may be displayed in the selected cassette information indicator 93 as the selected cassette information.

The tape printer 10 may be configured such that a plurality of types of tape cassettes 30 can be mounted therein simultaneously. This configuration eliminates the user's need to replace mounted cassettes each time the printing color or tape width changes.

When an overlay object is removed in the present embodiment, the layer screen corresponding to the deleted object is automatically removed from the layer editing screen 272 if the layer corresponding to the removed object has no other objects. However, the layer screen may be preserved and only deleted when the user selects the corresponding Delete button 96.

In the embodiment described above, the display unit 27 is capable of displaying images in color, but the display unit 27 may instead be incapable of displaying color images. In this case, the display unit 27 should depict colors in an identifiable manner, such as providing a symbol identifying a color in each object or each layer screen and by defining the color that each symbol represents. As an alternative to symbols, different colors may be represented using different types of hatching, such as diagonal lines, horizontal lines, vertical lines, and the like. The display unit 27 may also be provided as a separate unit from the editing device 20. In this case, the display unit 27 should be capable of communicating with the editing device 20, and the CPU 21 may transmit commands to the display unit 27 to perform various displays.

In the embodiment described above, a warning is issued for a warning-targeted layer stored in the RAM 24 by displaying the warning icon 99 (see FIG. 10) in the layer screen in association with the warning-targeted layer. However, a warning may be issued for the warning-targeted layer by rendering the label image for the warning-targeted layer so as to be distinguishable from other label images, or by outputting a sound or the like.

The user may perform an operation on the input unit 26 to select whether an added object is to be assigned to the base tape (base layer) or the overlay tape (normal layer). The user may also operate the input unit 26 to select whether the orientation should be set to the parallel orientation or the orthogonal orientation.

In the embodiment described above, the CPU 21 acquires mounted cassette information from the tape printer 10. However, the user may input the mounted cassette information into the editing device 20 through operations on the input unit 26. In other words, the CPU 21 may acquire mounted cassette information inputted by the user through the input unit 26. Further, in the embodiment described above, the CPU 11 of the tape printer 10 reads the mounted cassette information from the identification part 32 via the reading device 18. However, the tape cassette 30 may be provided with a storage unit (RF tag, for example) that stores the mounted cassette information, and the CPU 11 may read this mounted cassette information from the storage unit using the reading device 18. The user may also input mounted cassette information into the tape printer 10 through operations on the input unit 2. In other words, the CPU 11 may acquire mounted cassette information inputted by the user on the input unit 2. Thus, the method that the CPU 21 acquires mounted cassette information is not limited to any one of these methods.

In the embodiment described above, the editing device 20 is connected to the tape printer 10 via the network 100. However, the editing device 20 may be connected to the tape printer 10 by a cable or the like. In the embodiment described above, the entire main process is executed on the editing device 20. However, all or some of the main process may be executed on the tape printer 10. In other words, the CPU 11 of the tape printer 10 may execute all or some of the main process. In this case, the CPU 11 may display the full editing screen 271, layer editing screen 272, confirmation screen 273, print preview 274, and the like on the display unit 3 of the tape printer 10.

In place of the CPU 21, the editing device 20 may employ a microcomputer, application-specific integrated circuits (ASICs), field-programmable gate arrays (FPGAs), or the like as the controller. Portions of the main process may be distributed among a plurality of controllers or processors. The non-transitory storage medium may be any storage medium capable of holding information, regardless of the duration that the information is stored. The non-transitory storage medium need not include transitory storage media (conveyed signals, for example). The program may be downloaded from a server connected to the network 100 (i.e., transmitted as a transmission signal) and stored in the flash memory 22, for example. In this case, the program may be saved in a non-transitory storage medium, such as a hard disk drive provided in the server. The variations described above may be combined in any way that does not produce inconsistencies.

What is claimed is:

1. An editing device comprising a controller configured to perform:
   (a) editing print data for creating a composite label with a printer to which a tape cassette accommodating therein a tape and an ink ribbon is attachable, the tape extending in a longitudinal direction and having a tape width in a width direction orthogonal to the longitudinal direction, the ink ribbon having an ink color, the printer being configured to perform a single printing operation using the ink ribbon to print an object on the tape in a single printing color thereby creating a single label, the single printing color being identical to the ink color of the ink ribbon, the composite label having a plurality of labels including a base label and at least one overlay label and being created by affixing the at least one overlay label to the base label, the (a) editing comprising:
      (a1) acquiring a plurality of pieces of object data corresponding to respective ones of a plurality of objects, the plurality of pieces of object data representing respective ones of a plurality of object images, each of the plurality of object images being rendered in the single printing color, the print data being created using the plurality of pieces of object data;
      (a2) determining a printing color of a target object, the target object being selected one by one from among the plurality of objects;
      (a3) acquiring tape information on a target tape cassette to be used for printing the target object with the printer, the target tape cassette accommodating therein a target tape and a target ink ribbon, the target ink ribbon having the ink color identical to the printing color of the target object, the tape information of the target tape including width information indicating the tape width of the target tape and opacity information indicating whether the target tape is opaque;
      (a4) categorizing the target object to one of a base object and an overlay object according to the printing color of the target object and the tape information of the target tape, the plurality of objects being respectively categorized to a single base object and at least one overlay object;
      (a5) setting, in response to categorizing the target object to the overlay object, a target tape length and a target tape orientation, the target tape length being a length in the longitudinal direction of the target tape used for creating the overlay label; and
      (a6) setting a print mode to one of a shortest length mode in which a single overlay label is created for each overlay object and a fewest prints mode in which a single overlay label is created for all overlay objects each of which has a same printing color; and
   (b) displaying a composite label image of the composite label based on the print data on a display.

2. The editing device according to claim 1, wherein the (a) editing further comprises:
   (a7) acquiring mounted cassette information on a mounted tape cassette currently attached to the printer, the mounted tape cassette accommodating therein a mounted tape and a mounted ink ribbon, the mounted cassette information including the tape information of the mounted tape and the ink color of the mounted ink ribbon, wherein the (a4) categorizing categorizes the target object according to the tape information of the mounted tape and the ink color of the mounted ink ribbon in addition to the printing color of the target object and the tape information of the target tape.

3. The editing device according to claim 1, wherein the (a) editing further comprises:
(a8) creating one of a base layer and an overlay layer corresponding to the target object, the base layer being created in response to categorizing the target object to the base object, the overlay layer being created in response to categorizing the target object to the overlay object, a plurality of layers including the base layer and at least one overlay layer being created corresponding to respective ones of the plurality of objects; and
wherein the (b) displaying comprises:
(b1) displaying on the display a layer preview screen based on the print data, the layer preview screen comprising a plurality of layer previews including a base layer preview corresponding to the base layer and at least one overlay layer preview corresponding to respective ones of the at least one overlay layer.

4. The editing device according to claim 3, wherein the (a) editing further comprises:
(a9) combining, in response to setting the print mode to the fewest prints mode, one or more overlay layers corresponding to respective ones of one or more overlay objects each of which has a same printing color into a single overlay layer, the single overlay layer corresponding to one of the at least one overlay label, and
wherein the (b1) displaying displays on the display the layer preview screen comprising the base layer preview corresponding to the base label and at least one overlay layer preview corresponding to respective ones of the at least one overlay label.

5. The editing device according to claim 3, wherein the (a8) creating creates, in response to setting the print mode to the shortest length mode, a separate layer corresponding to each of the plurality of objects, and
wherein the (b1) displaying displays the layer preview screen comprising a separate layer preview corresponding to the separate layer.

6. The editing device according to claim 3, wherein the (a) editing further comprises:
(a10) receiving deletion of one of the plurality of objects; and
(a11) deleting, in response to receiving the deletion of the one of the plurality of objects after the (a8) creating creates the plurality of layers, one of the plurality of layers corresponding to the deleted one of the plurality of objects, and
wherein the (b) displaying further comprises:
(b2) deleting, in response to the (a11) deleting being performed while the (b1) displaying displays the layer preview screen comprising the plurality of layer previews corresponding to respective ones of the plurality of objects, a layer preview corresponding to the deleted one of the plurality of objects from the layer preview screen.

7. The editing device according to claim 3, wherein each of the at least one overlay layer preview includes an image of corresponding one of the at least one overlay label and a base label border indicating an outer shape of the base label in the composite label.

8. The editing device according to claim 3, wherein the (a8) creating creates the plurality of layers corresponding to respective ones of the plurality of labels in the composite label, and the (b1) displaying displays the layer preview screen comprising the plurality of layer previews corresponding to respective ones of the plurality of labels,
wherein the controller is configured to further perform:
(c) receiving a command for outputting the print data to the printer;
(d) displaying, in response to the command, on the display a print preview screen based on the print data, the print preview screen including a list of a plurality of label images corresponding to respective ones of the plurality of layer previews included in the layer preview screen; and
(e) outputting, in response to the command, to the printer the print data for each of the plurality of label images, and
wherein the (d) displaying displays a label image for which the (e) outputting has outputted the print data so as to be distinguishable from a label image for which the (e) outputting has not outputted the print data.

* * * * *